(12) United States Patent
Gotman et al.

(10) Patent No.: US 9,130,626 B2
(45) Date of Patent: Sep. 8, 2015

(54) FREQUENCY DEPENDENT I/Q IMPAIRMENT COMPENSATION

(71) Applicant: QUALCOMM Incorporated, San Diego, CA (US)

(72) Inventors: Maxim Gotman, Kfar-Saba (IL); Tal Oved, Modi'in (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/226,588

(22) Filed: Mar. 26, 2014

(65) Prior Publication Data

US 2014/0307768 A1 Oct. 16, 2014

Related U.S. Application Data

(60) Provisional application No. 61/810,522, filed on Apr. 10, 2013, provisional application No. 61/811,512, filed on Apr. 12, 2013.

(51) Int. Cl.
| | |
|---|---|
| *H03H 7/30* | (2006.01) |
| *H03H 7/40* | (2006.01) |
| *H03K 5/159* | (2006.01) |
| *H04B 1/04* | (2006.01) |
| *H04B 7/04* | (2006.01) |

(Continued)

(52) U.S. Cl.
CPC ............ *H04B 1/0475* (2013.01); *H04B 7/0413* (2013.01); *H04L 27/01* (2013.01); *H04L 27/2636* (2013.01); *H04L 27/364* (2013.01); *H04L 27/3863* (2013.01)

(58) Field of Classification Search
CPC .... H04B 1/0475; H04B 7/0413; H04L 27/01; H04L 27/2636; H04L 27/364; H04L 27/3863; H04L 27/3872
USPC .................. 375/260, 235, 261, 264, 298, 296; 455/501, 63.1; 370/210
See application file for complete search history.

(56) References Cited

U.S. PATENT DOCUMENTS

| | | | |
|---|---|---|---|
| 7,274,750 B1 | 9/2007 | Mueller | |
| 7,333,423 B2 * | 2/2008 | Palaskas et al. | ............... 370/210 |

(Continued)

OTHER PUBLICATIONS

ISA/EPO, International Search Report and Written Opinion of the International Searching Authority, Int'l App. No. PCT/US2014/032119, Sep. 10, 2014, European Patent Office, Rijswijk, NL, 14 pgs.

(Continued)

*Primary Examiner* — Phuong Phu
(74) *Attorney, Agent, or Firm* — Holland & Hart LLP

(57) ABSTRACT

Methods, systems, and devices are described for compensating for transmit I/Q impairments in a digital signal. A frequency domain version of a first one of the components may be scaled at a wireless modem according to a frequency dependent I/Q impairment compensation function to obtain a compensated frequency domain version of the first one of the components. The compensated frequency domain version of the first one of the components may be combined with a frequency domain version of a second one of the components at the wireless modem to produce a compensated frequency domain version of the digital signal. The compensated frequency domain version of the digital signal may be transformed to the time domain at the wireless modem to produce a compensated time domain version of the digital signal.

27 Claims, 20 Drawing Sheets

(51) Int. Cl.
*H04L 27/01* (2006.01)
*H04L 27/26* (2006.01)
*H04L 27/36* (2006.01)
*H04L 27/38* (2006.01)

(56) References Cited

U.S. PATENT DOCUMENTS

| | | | |
|---|---|---|---|
| 7,738,572 B2 * | 6/2010 | Lin | 375/260 |
| 7,944,984 B1 | 5/2011 | Wu et al. | |
| 8,085,863 B2 | 12/2011 | Gupta | |
| 8,090,011 B2 | 1/2012 | Asami | |
| 8,218,687 B2 | 7/2012 | Sayers | |
| 8,290,450 B2 | 10/2012 | Hammerschmidt et al. | |
| 2003/0206603 A1 | 11/2003 | Husted | |
| 2011/0069740 A1 | 3/2011 | Cowley et al. | |
| 2012/0109548 A1 | 5/2012 | Asami | |
| 2013/0243060 A1 | 9/2013 | Dark et al. | |

OTHER PUBLICATIONS

Sun et al., "A 62.8 mW 4×4 MIMO-OFDM Modem with One-Symbol-Locked Timing Recovery, Frequency-Dependent I/Q Mismatch Estimation and Adaptive Equalization," IEEE Asian Solid-State Circuits Conference, Taipei, Taiwan, Nov. 16-18, 2009, pp. 381-384, ISBN 978-1-4244-4434-2, Institute of Electrical and Electronics Engineering.

Sun et al., "Preamble-Assisted Estimation for Frequency-Dependent I/Q Mismatch in Direct-Conversion OFDM Receivers," IEICE Transactions on Communications, pp. 2426-2432, Jul. 2009, vol. E92-B, No. 7, XP-001547796, the Institute of Electronics, Information and Communication Engineers.

Traverso et al, "Frequency-Selective I/Q Imbalance and Channel Estimation in OFDM Receivers," Proceedings of the 1st European Wireless Technology Conference, EuWiT 2008, pp. 65-68, Oct. 27-28, 2008, ISBN 978-2-87487-008-8, European Microwave Association, Amsterdam, The Netherlands.

Valkama et al., "Some Radio Implementation Challenges in 3G-LTE Context," IEEE 8th Workshop on Signal Processing Advances in Wireless Communications, SPAWC 2007, Helsinki, ISBN 978-1-4244-0955, Jun. 17-20, 2007, 5 pgs, Institute of Electrical and Electronics Engineering.

IPEA/EPO, Second Written Opinion of the International Preliminary Examining Authority, Int'l. App. No. PCT/US2014/032119, Apr. 13, 2015, European Patent Office, Rijswijk, NL, 7 pgs.

IPEA/EPO, Second Written Opinion of the International Preliminary Examining Authority, Int'l. App. No. PCT/US2014/032119, Jul. 8, 2015, European Patent Office, Rijswijk, NL, 9 pgs.

* cited by examiner

FREQUENCY DEPENDENT I/Q IMPAIRMENT COMPENSATION

CROSS REFERENCES

The present application for patent claims priority to U.S. Provisional Patent Application No. 61/810,522 by Gotman et al., entitled "FREQUENCY DEPENDENT I/Q IMPAIRMENT COMPENSATION," filed Apr. 10, 2013, and to U.S. Provisional Patent Application No. 61/811,512 by Gotman et al., entitled "FREQUENCY DEPENDENT RECEIVE I/Q IMBALANCE COMPENSATION," filed Apr. 12, 2013, both of which are assigned to the assignee hereof, and expressly incorporated by reference herein.

BACKGROUND

The following relates generally to wireless communication, and more specifically to compensation for I/Q impairments in wireless communications. Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communication system may include a number of base stations, each simultaneously supporting communication for multiple wireless devices (e.g., mobile devices). Base stations may communicate with mobile devices on downstream and upstream links. Each base station has a coverage range, which may be referred to as the coverage area of the cell.

When transmitting a signal via a wireless communication system, a wireless modem may be used to transmit the signal. As the signal is prepared for transmission, the wireless modem, and typically an analog I/Q modulator/demodulator of the wireless modem, may introduce I/Q impairments into the signal. The I/Q impairments (e.g., gain and phase imbalances) may interfere with reception of the signal. When a signal is transmitted via a wireless communication system, a wireless modem may then be used to receive, demodulate, and decode the signal. As the signal is received, the wireless modem, and typically an analog in-phase/quadrature (I/Q) demodulator of the wireless modem, may introduce I/Q impairments into the signal.

SUMMARY

The described features generally relate to one or more improved methods, systems, and/or devices for compensating for I/Q impairments in a digital signal by decomposing the digital signal into an two components and compensating one of the components according to a frequency-dependent compensation function.

A method is described wherein a signal is decomposed into a plurality of components. A frequency domain version of a first component from the plurality of components is scaled according to a frequency dependent I/Q impairment compensation function to obtain a compensated frequency domain version of the first component. The compensated frequency version of the first component is combined with a frequency domain version of a second component from the plurality of components to produce a compensated frequency domain version of the digital signal.

An apparatus for compensating for I/Q impairments in a digital signal is described. The apparatus includes means for decomposing the digital signal into a plurality of components, means for scaling a frequency domain version of a first component from the plurality of components according to a frequency dependent I/Q impairment compensation function to obtain a compensated frequency domain version of the first component, and means for combining the compensated frequency version of the first component with a frequency domain version of a second component from the plurality of components to produce a compensated frequency domain version of the digital signal.

A wireless modem configured to compensate for transmit I/Q impairments in a digital signal is described. The wireless modem includes a processor and a scaling circuit configured to scale a frequency domain version of a first component from the plurality of components according to a frequency dependent I/Q impairment compensation function to obtain a compensated frequency domain version of the first component. An adder circuit is configured to combine the compensated frequency version of the first component with a frequency domain version of a second component from the plurality of components to produce a compensated frequency domain version of the digital signal.

A non-transitory computer-readable medium is described. The non-transitory computer-readable storage medium stores instructions executable by at least one processor to decompose the digital signal into a plurality of components; scale a frequency domain version of a first component from the plurality of components according to a frequency dependent I/Q impairment compensation function to obtain a compensated frequency domain version of the first component; and combine the compensated frequency version of the first component with a frequency domain version of a second component from the plurality of components to produce a compensated frequency domain version of the digital signal.

In certain aspects of the method, apparatus, wireless modem, or non-transitory computer-readable medium, the digital signal may include an in-phase component and a quadrature component in a time domain. Each of the frequency domain version of the first component and the frequency domain version of the second component may correspond to one of the in-phase component or the quadrature component.

In certain aspects of the method, apparatus, wireless modem, or non-transitory computer-readable medium, the compensated frequency domain version of the digital signal may be equalized in the frequency domain prior to transforming the compensated frequency domain version of the digital signal to the time domain. The equalizing may include equalizing in the frequency domain at least one or more of an in-band amplitude ripple associated with at least one analog low-pass filter or an in-band phase ripple associated with the at least one analog low-pass filter. In certain aspects, the equalization may be performed by an equalizer circuit communicatively coupled with the adder circuit or other means for performing the equalization.

In certain aspects of the method, apparatus, wireless modem, or non-transitory computer-readable medium, the compensation function may include a precompensation function, and the compensated frequency domain version of the digital signal may include a precompensated frequency domain version of the digital signal produced prior to transmitting the digital signal. The precompensated frequency domain version of the digital signal may be transformed to a time domain at a wireless modem to produce a precompensated time domain version of the digital signal. The precompensated time domain version of the digital signal may be transmitted from the wireless modem over a wireless channel.

In certain aspects of the method, apparatus, wireless modem, or non-transitory computer-readable medium, a discrete Fourier transform may be performed separately on a time domain version of the first component and a time domain version of the second component of the digital signal to obtain the frequency domain version of the first component, which may be an in-phase or even component of the digital signal, and the frequency domain version of the second component, which may be a quadrature or odd component of the digital signal, respectively. The discrete Fourier transform of the time domain version of the first component may be performed by a first discrete Fourier transform circuit, or other means for performing the discrete Fourier transform, and the direct Fourier transform of the time domain version of the second component may be performed by a second discrete Fourier transform circuit, or other means for performing the discrete Fourier transform.

In certain aspects of the method, apparatus, wireless modem, or non-transitory computer-readable medium, the digital signal may include a single carrier signal. In such cases, an inverse discrete Fourier transform may be performed on the compensated frequency domain version of the digital signal; and baseband demodulation may be performed on an output of the inverse discrete Fourier transform or on the compensated frequency domain version of the digital signal. The inverse discrete Fourier transform may be performed by an inverse Fourier transform circuit or other means for performing the inverse discrete Fourier transform. The baseband demodulation may be performed by a baseband modulator/demodulator circuit, or other means for performing baseband demodulation, communicatively coupled with an output of the inverse discrete Fourier transform circuit.

In certain aspects of the method, apparatus, wireless modem, or non-transitory computer-readable medium, a gain imbalance coefficient and a phase imbalance coefficient of the digital signal may be selected with respect to a frequency of the first component. The selection may be performed by a selection circuit or other means for selecting the gain imbalance coefficient and the phase imbalance coefficient. The frequency dependent I/Q impairment compensation function may be based on the gain imbalance coefficient and the phase imbalance coefficient. In certain aspects, at least one measurement of an I/Q impairment associated with a wireless channel may be received. One or both of the gain imbalance coefficient or the phase imbalance coefficient may be determined based on the received at least one measurement.

In certain aspects of the method, apparatus, wireless modem, or non-transitory computer-readable medium, scaling the frequency domain version of the first component may include using a frequency-dependent scalar for the first component, wherein the frequency-dependent scalar is defined by $$\frac{1 \pm j\beta(f)}{1 + \alpha(f)}$$

wherein $\alpha$ is the gain imbalance coefficient, $\beta$ is the phase imbalance coefficient, and f is the frequency. The frequency-dependent scalar may be used by the aforementioned scaling circuit or other means for scaling.

In certain aspects of the method, apparatus, wireless modem, or non-transitory computer-readable medium, a plurality of versions of the digital signal may be received from a plurality of antenna ports in accordance with a multiple input multiple output (MIMO) transmission of the digital signal, each antenna port being associated with a separate gain imbalance coefficient and a separate phase imbalance coefficient. The plurality of versions of the digital signal may be received by a MIMO detector or other means for receiving the plurality of versions. A joint imbalance compensation and spatial equalization operation may be performed on the frequency domain version of the first one of the components by multiplying the frequency domain version of the first one of the components by a MIMO spatial equalizer matrix adapted according to the gain imbalance coefficients and phase imbalance coefficients of the plurality of antenna ports. The joint imbalance compensation and spatial equalization operation may be performed by a receiver processor, dedicated circuitry, or other means for performing the joint imbalance compensation and spatial equalization operation.

In certain aspects of the method, apparatus, wireless modem, or non-transitory computer-readable medium, the frequency domain version of the first component of the OFDM signal may be computed as $$X_e(f) = \frac{1}{2}[X(f) \pm X^*(-f)];$$

and the frequency domain version of the second component of the digital signal may be computed as $$X_o(f) = \frac{1}{2}[X(f) - X^*(-f)];$$

wherein $X_e$ (f) comprises the first component of the digital signal, $X_o$ (f) comprises the second component of the digital signal, X(f) comprises a frequency domain version of the digital signal, and f comprises a frequency.

In certain aspects of the method, apparatus, wireless modem, or non-transitory computer-readable medium, the wireless modem may include an equalizer circuit communicatively coupled with the adder circuit and configured to equalize the compensated frequency domain version of the digital signal in a frequency domain prior to transforming the compensated frequency domain version of the digital signal to a time domain. The equalizing may include equalizing in the frequency domain at least one or more of an in-band amplitude ripple associated with at least one analog low-pass filter of the wireless channel or an in-band phase ripple associated with the at least one analog low-pass filter.

In certain aspects of the method, apparatus, wireless modem, or non-transitory computer-readable medium, the wireless modem may include a receiver configured to receive the digital signal over a wireless channel, the digital signal comprising an in-phase component and a quadrature component; and a plurality of discrete Fourier transform circuits configured to separately transform the in-phase and quadrature components of the received digital signal to a frequency domain to produce a frequency domain version of each of the components.

In certain aspects of the method, apparatus, wireless modem, or non-transitory computer-readable medium, the digital signal may be a single carrier signal, and the wireless modem may further include an inverse discrete Fourier transform circuit configured to transform the imbalance compensated frequency domain version of the digital signal to a time domain; and a baseband modulator/demodulator circuit communicatively coupled with an output of the inverse discrete Fourier transform circuit.

In certain aspects of the method, apparatus, wireless modem, or non-transitory computer-readable medium, the wireless modem may include an inverse discrete Fourier transform circuit configured to transform the compensated frequency domain version of the digital signal to a time domain to produce a precompensated time domain version of the digital signal; and a transmitter configured to transmit the precompensated time domain version of the digital signal over a wireless channel.

In certain aspects of the method, apparatus, wireless modem, or non-transitory computer-readable medium, the wireless modem may include a first discrete Fourier transform circuit configured to transform a time domain version of the first component of the digital signal to the frequency domain version of the first component; and a second discrete Fourier transform circuit configured to transform a time domain version of the second component of the digital signal to the frequency domain version of the second component.

In certain aspects of the method, apparatus, wireless modem, or non-transitory computer-readable medium, the wireless modem may further include a selection module configured to select an impairment compensation module including the scalar module and the adder circuit from a plurality of impairment compensation modules, the selected impairment compensation module associated with at least a gain imbalance coefficient and a phase imbalance coefficient of the digital signal with respect to a frequency of the first one of the components. The frequency dependent I/Q impairment compensation function of the selected impairment compensation module may be based on the gain imbalance coefficient and the phase imbalance coefficient. The selection module may be further configured to receive at least one measurement of the transmit I/Q impairments associated with the wireless channel; and determine at least one or both of the gain imbalance coefficient and the phase imbalance coefficient based on the received at least one measurement.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
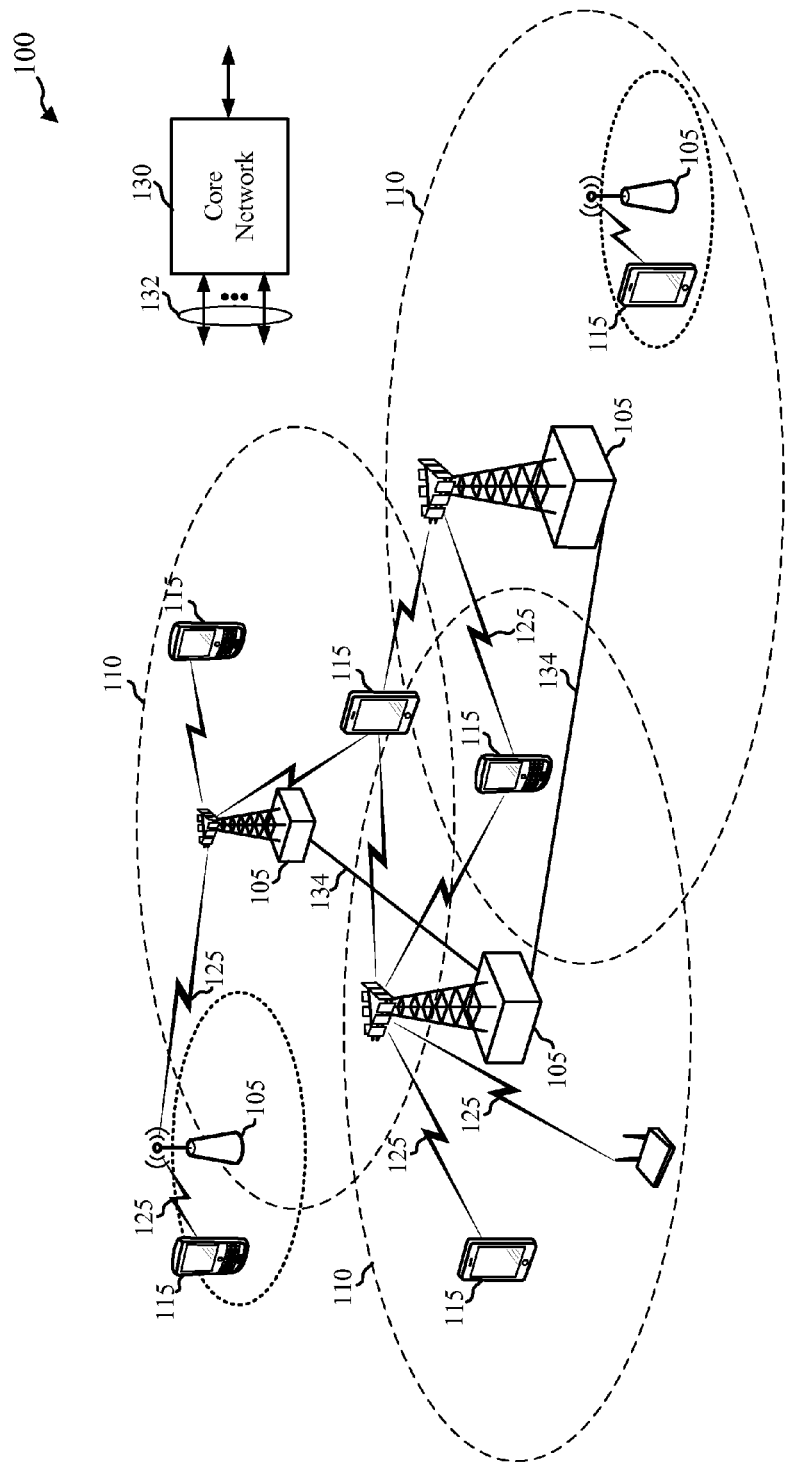
FIG. 1 shows an isometric view diagram of a wireless communication system.

As noted above, when transmitting a signal via a wireless communication system, a wireless modem may be used to encode, modulate, and transmit the signal. As the signal is prepared for transmission, the wireless modem, and typically an analog I/Q modulator/demodulator of the wireless modem, may introduce I/Q impairments (e.g., transmit I/Q impairments) into the signal. The I/Q impairments (e.g., gain and phase imbalances) may interfere with reception of the signal.

When a signal is transmitted via a wireless communication system, a wireless modem may be used to receive, demodulate, and decode the signal. As the signal is received, the wireless modem, and typically an analog I/Q demodulator of the wireless modem, may introduce I/Q imbalances (e.g., receive I/Q imbalances) into the signal. The I/Q imbalances (e.g., gain and phase imbalances) may interfere with reception, demodulation, and decoding of the signal, which may introduce error into the signal and effectively lower the transmission rate of the signal.

In the past, I/Q impairments have typically been compensated in the time domain, using a single pair of scalar values (e.g., a gain imbalance coefficient and a phase imbalance coefficient) across the entire transmit bandwidth (e.g., for all transmit frequencies). However, I/Q impairments may be frequency dependent. As the transmit bandwidth of a wireless device expands, the desirability of compensating for I/Q impairments associated with different signal frequencies may increase. Thus, described herein are methods, systems, and apparatuses for compensating for transmit I/Q impairments in a frequency domain. The methods, systems, and apparatuses operate on a digital signal decomposed to an even spectrum component and an odd spectrum component. The methods, systems, and apparatuses may be applied, for example, to a single carrier signal by converting the signal from the time domain to the frequency domain; compensating for I/Q impairments; and then transforming the signal back to the time domain before transmission on a single-carrier wireless channel, or before baseband demodulation if the signal is being received. The methods, systems, and apparatuses may also be applied to an OFDM signal by computing the odd and even components of the signal; compensating for I/Q impairments; and then transforming the signal to the time domain before transmission on an OFDM wireless channel. In some cases, signal equalization may also be performed in the frequency domain, subsequent to compensation for I/Q impairments.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communication system 100. The wireless communication system 100 includes a plurality of wireless devices, including base stations (or cells) 105 and other wireless devices 115. The wireless communication system 100 also includes a core network 130. The base stations 105 may communicate with the wireless devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control signals, etc.), overhead information, data, etc.

The base stations 105 may wirelessly communicate with the wireless devices 115 via one or more base station antennas. Each of the base station 105 sites may provide communication coverage for a respective geographic coverage area 110. In some embodiments, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The geographic coverage area 110 for a base station may be divided into sectors making up only a portion of the coverage area. The wireless communication system 100 may include base stations 105 of different types (e.g., macro, micro, and/or pico base stations). There may be overlapping coverage areas for different technologies.

In some embodiments, the wireless communication system 100 may be an LTE/LTE-A network. In LTE/LTE-A networks, the terms evolved Node B (eNB) and user equipment (UE) may be generally used to describe the base stations 105 and wireless devices 115, respectively. The wireless communication system 100 may be a Heterogeneous LTE/LTE-A network in which different types of eNBs provide coverage for various geographical regions. For example, each eNB may provide communication coverage for a macro cell, a pico cell, a femto cell, and/or other types of cell. A macro cell may generally cover a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul link 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The wireless devices 115 may be dispersed throughout the wireless communication system 100. One or more of the wireless devices 115 may also be referred to by those skilled in the art as a UE, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless device 115 may include, for example, a cellular phone, a personal digital assistant (PDA), a wireless modem, a wireless communication device, a handheld device, a tablet computer, a laptop computer, a cordless phone, a wireless local loop (WLL) station, or the like. A UE or wireless device 115 may be able to communicate with macro eNBs, pico eNBs, femto eNBs, relays, and the like.

The communication links 125 shown in wireless communication system 100 may include uplink transmissions from a wireless device 115 to a base station 105, and/or downlink transmissions, from a base station 105 to a wireless device 115. The downlink transmissions may also be called forward link transmissions while the uplink transmissions may also be called reverse link transmissions.

Each of the communication links 125 between a base station 105 and a wireless device 115, and each of the backhaul links 134 between base stations 105, may be implemented over a number of wireless channels. Under some conditions, the signals transmitted over the wireless channels may suffer from I/Q impairments associated with analog components in the transmit pipeline, particularly I/Q modulator/demodulators and analog filters. In the past, these I/Q impairments have been compensated for in the time domain using a single scalar pair of values (e.g., a gain imbalance coefficient and a phase imbalance coefficient), regardless of the signal's frequency. However, because I/Q impairments may be frequency dependent, it may be useful to incorporate a frequency dependent impairment compensation module into some or all of the base stations 105 and/or other wireless devices 115.

As such, the wireless modems associated with one or more of the wireless devices 115 and one or more of the base stations 105 may be configured to perform frequency domain I/Q imbalance precompensation on signals to be transmitted or compensation on signals that have been received. This I/Q imbalance compensation may include scaling a frequency domain version of a first even or odd component of the signal according to a frequency dependent I/Q impairment compensation function to obtain a compensated frequency domain version of the first component of the digital signal. The compensated frequency domain version of the first even or odd component may be combined with a frequency domain version of a second even or odd component of the digital signal at the wireless modem to produce a compensated frequency domain version of the digital signal. The compensated frequency domain version of the digital signal may then be transformed to a time domain at the wireless modem to produce a compensated time domain version of the digital signal, which may be transmitted from the wireless modem over a wireless channel.

While the wireless communication system 100 may be principally described in relation to LTE/LTE-A architectures, those skilled in the art will readily appreciate that the various concepts presented throughout this disclosure may be extended to other types of wireless communication systems or networks.

Figure 2:
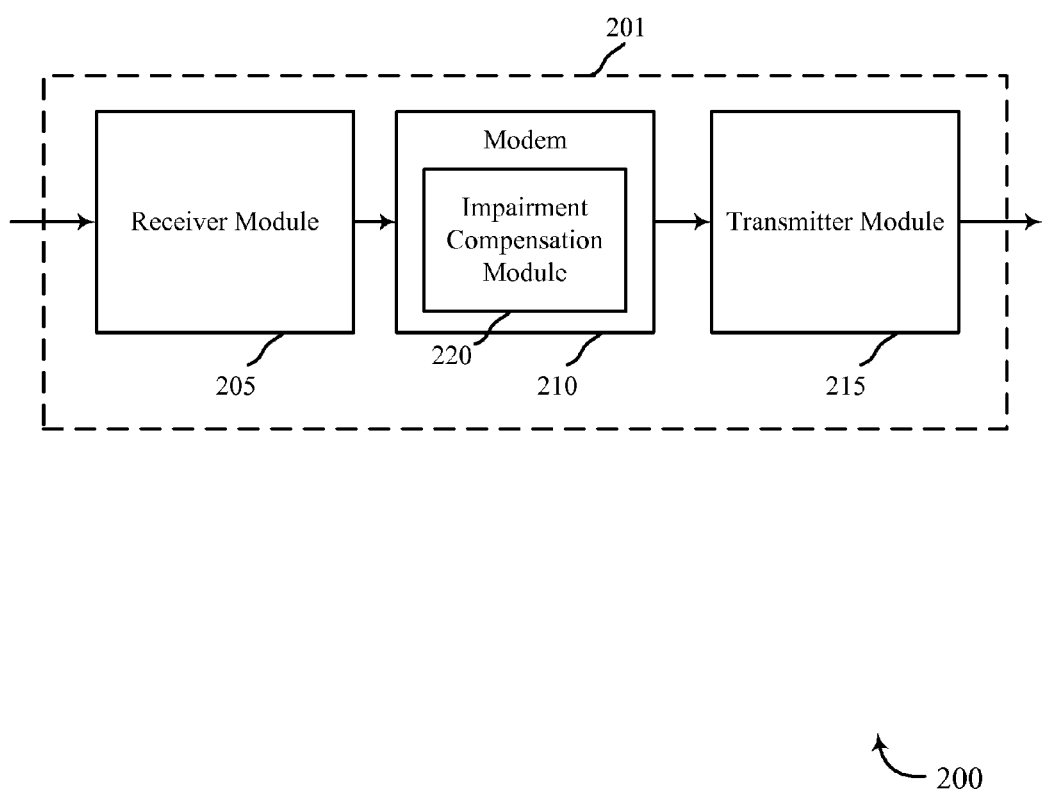
FIG. 2 is a block diagram illustrating one example of a wireless device in accordance with various embodiments.

FIG. 2 is a block diagram 200 illustrating one embodiment of a wireless device 201 in accordance with the present systems and methods. The wireless device 201 may be an example of one or more of the base stations 105 or other wireless devices 115 illustrated in FIG. 1. The wireless device 201 may include a receiver module 205, a wireless modem 210, and a transmitter module 215. Each of these components may be in communication with each other, directly or indirectly.

The components of the wireless device 201 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some configurations, the receiver module 205 may include a cellular or other type of wireless receiver (e.g., an LTE/LTE-A receiver) and may receive transmissions from one or more other wireless devices (e.g., base stations 105 or other wireless devices 115). The transmissions may include various types of traffic data, control signals, and/or other transmissions. The transmissions may be received over a number of wireless channels, such as a number of wireless channels of a downlink or uplink of one of the communication links 125 shown in FIG. 1 or a number of wireless channels of one of the backhaul links 134 shown in FIG. 1.

The transmitter module 215 may also include a cellular or other type of wireless transmitter (e.g., an LTE/LTE-A transmitter) and may transmit various types of traffic data, control signals, and/or other transmissions to one or more other wireless devices (e.g., base stations 105 or other wireless devices 115). The transmissions may be sent over a number of wireless channels, such as a number of wireless channels of a downlink or uplink of one of the communication links 125 shown in FIG. 1 or a number of wireless channels of one of the backhaul links 134 shown in FIG. 1. In some embodiments, the wireless modem 210 may prepare the traffic data, control signals, and/or other transmissions that are to be transmitted on a wireless channel or channels via the transmitter module 215.

The wireless modem 210 may in some cases include an impairment compensation module 220. The impairment compensation module 220 may compensate for transmit I/Q impairments in one or more digital signals to be transmitted by the transmitter module 215 or received by the receiver module 205. For example, the impairment compensation module 220 may perform the compensation by scaling a frequency domain version of a first one of the components (i.e., the even component or the odd component) according to a frequency dependent I/Q impairment compensation function to obtain a compensated frequency domain version of the first one of the components. The impairment compensation module 220 may then combine the compensated frequency domain version of the first one of the components with a frequency domain version of a second one of the components to produce a compensated frequency domain version of the digital signal. Thereafter, the impairment compensation module 220 may transform the compensated frequency domain version of the digital signal to a time domain at the wireless modem to produce a compensated time domain version of the digital signal. The compensated time domain version of the digital signal may be transmitted from the wireless modem 210, via the transmitter module 215, over a wireless channel.

In contrast to past systems and methods where I/Q impairments have been compensated for in the time domain using a single scalar pair of values (e.g., a single gain imbalance coefficient and a single phase imbalance coefficient), regardless of the digital signal's frequency, the impairment compensation module 220 compensates for I/Q impairments in the frequency domain using a frequency dependent I/Q impairment compensation function (e.g., a function employing a frequency dependent gain imbalance coefficient and a frequency dependent phase imbalance coefficient). In this manner, it may be possible to better compensate for I/Q impairments over a wider frequency bandwidth.

Figure 3A:
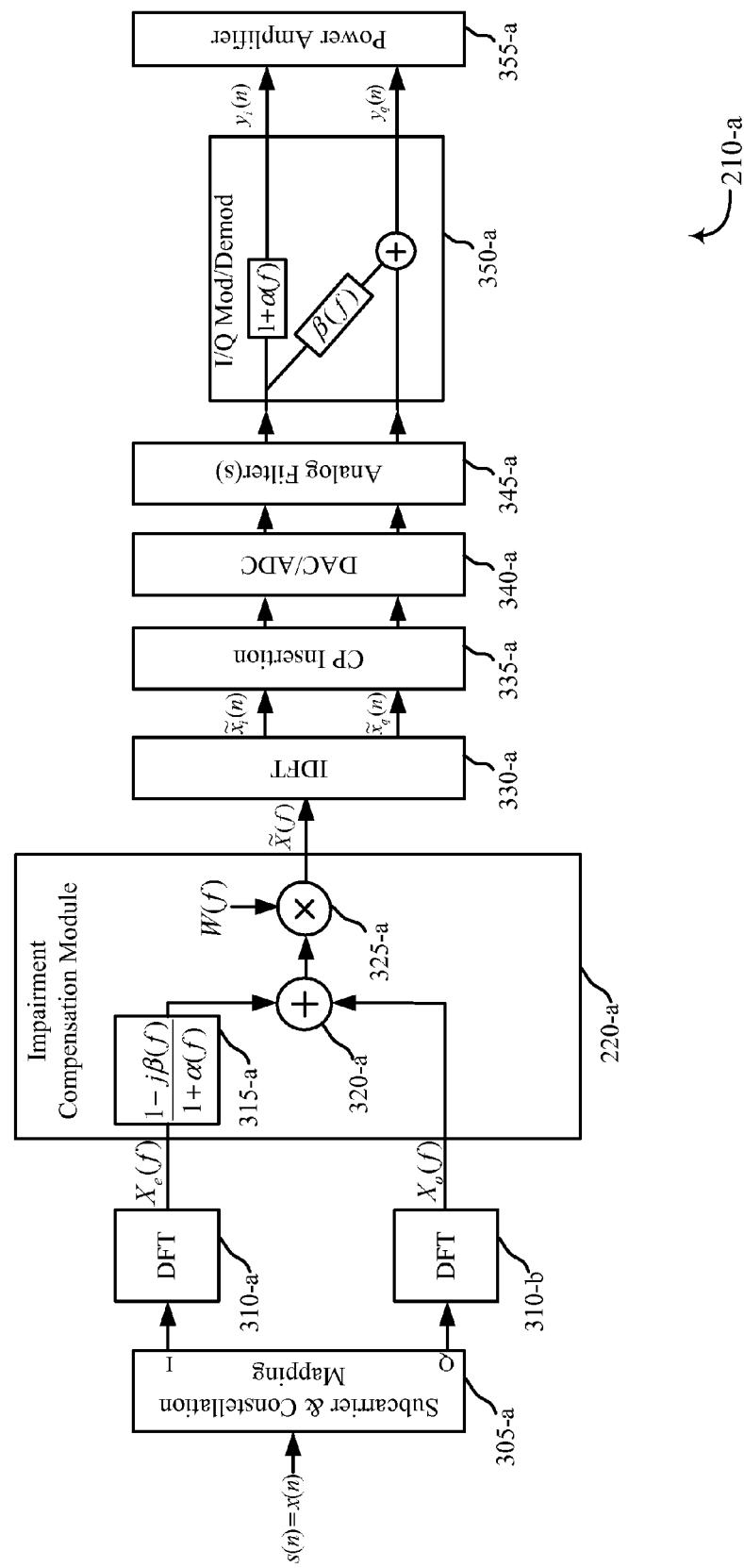
FIG. 3A is a block diagram illustrating one example of a wireless modem configured in accordance with various embodiments, wherein the wireless modem may be configured to transmit a signal over a single-carrier wireless channel.

FIGS. 3A, 3B, 3C, 3D, 4A, 4B, 4C, 4D, 5, and 6 illustrate various more detailed examples of the wireless modem 210 described with reference to FIG. 2. FIG. 3A, for example, shows a wireless modem 210-*a* for processing a digital signal including a single carrier signal. The wireless modem 210-*a* may be an example of the wireless modem 210 shown in FIG. 2. The wireless modem 210-*a* may include a subcarrier and constellation mapping module 305-*a*, first and second discrete Fourier transform (DFT) circuits 310-*a*, 310-*b*, an impairment compensation module 220-*a*, an inverse DFT (IDFT) circuit 330-*a*, a CP insertion module 335-*a*, a digital-to-analog/analog-to-digital converter (DAC/ADC) module 340-*a*, analog filter(s) 345-*a*, an I/Q modulator/demodulator 350-*a*, and a power amplifier 355-*a*. Each of these components may be in communication with each other, directly or indirectly.

Turning first to the I/Q modulator/demodulator 350-*a*, the modulated single carrier signal y(n) output by the I/Q modulator/demodulator 350-*a* is shown to have a frequency dependent gain imbalance which may be expressed as 1+α(f) and a frequency dependent phase imbalance which may be expressed as β(f), where α includes a gain imbalance coefficient, β includes a phase imbalance coefficient, and f includes a frequency of an in-phase or even component $y_i(n)$ of the single carrier signal y(n) (or simply a frequency of the signal y(n)). By way of example, the frequency dependent phase imbalance β(f) may be modeled with respect to the in-phase or even component $y_i(n)$ of the single carrier signal. The frequency dependent gain imbalance and frequency dependent phase imbalance may be the I/Q impairments for which the impairment compensation module 220-*a* compensates.

The gain and phase imbalance coefficients may in some cases be determined by receiving at least one measurement of the transmit I/Q impairments associated with a single-carrier wireless channel on which the single carrier signal y(n) may be modulated, and then determining at least one or both of the gain imbalance coefficient or the phase imbalance coefficient based on the received at least one measurement.

Moving upstream in the transmit path through the wireless modem 210-*a*, the subcarrier and constellation mapping module 305-*a* may receive a time domain series of bits s(n)= x(n) representing a digital signal to be transmitted by the wireless modem 210-*a* on a single-carrier wireless channel (e.g., a wireless channel that employs a single carrier signal). The subcarrier and constellation mapping module 305 may map the series of bits to in-phase and quadrature component streams (i.e., in-phase and quadrature components) that may be respectively received by the DFT circuits 310-*a*, 310-*b*. In certain examples, the DFT circuits 310-*a*, 310-*b* may be implemented by a digital signal processor configured to perform a separate Fast Fourier Transform (FFT) on each of the in-phase and quadrature components.

The first DFT circuit 310-*a* may be configured to transform a time domain version of a first one of the components of the digital signal (e.g., the in-phase or even component) to a frequency domain version $X_e(f)$ of the first one of the components. Similarly, the second DFT circuit may be configured to transform a time domain version of a second one of the components of the digital signal (e.g., the quadrature phase or odd component) to the frequency domain version $X_o(f)$ of the second one of the components.

The impairment compensation module 220-*a* may include a scalar module 315-*a*, an adder circuit 320-*a*, and/or a frequency domain equalizer circuit 325-*a*. The scalar module 315-*a* may be configured to scale the frequency domain version of the first one of the components $X_e(f)$ according to a frequency dependent I/Q impairment precompensation function to obtain a precompensated frequency domain version of the first one of the components. The scalar module 315-*a* may be configured to determine a frequency-dependent scalar for the component $X_e(f)$ as $$\frac{1 - j\beta(f)}{1 + \alpha(f)}$$

where f includes a frequency of the component $X_e(f)$, and where α and β are the respective gain and phase imbalance coefficients for the frequency f.

The adder circuit 320-*a* may be configured to combine the precompensated frequency domain version of the first one of the components with a frequency domain version of the second one of the components to produce a precompensated frequency domain version of the digital signal at the output of the adder circuit 320-*a*.

The IDFT circuit 330-*a* may be configured to transform the precompensated frequency domain version $\tilde{X}(f)$ of the digital signal to a time domain to produce a precompensated time domain version of the digital signal (e.g., $\tilde{x}_i(n)$ and $\tilde{x}_q(n)$). In certain examples, the IDFT circuits 330-*a* may be implemented by a digital signal processor configured to perform an inverse Fast Fourier Transform (IFFT) on the precompensated frequency domain version $\tilde{X}(f)$ of the digital signal. Optionally, a frequency domain equalizer circuit 325-*a* may be disposed between and communicatively coupled with the adder circuit 320-*a* and the IDFT circuit 330-*a*, such that the IDFT circuit 330-*a* may be configured to transform an equalized precompensated frequency domain version of the digital signal to the time domain. The frequency domain equalizer circuit 325-*a* may receive the output of the adder circuit 320-*a* and be configured (e.g., via a set of equalizer taps W(f)) to equalize, in the frequency domain, at least one or more of an in-band amplitude ripple associated with at least one analog low-pass filter of the wireless channel (e.g., at least one of the filters in the analog filter(s) 345-*a*) or an in-band phase ripple associated with the at least one analog low-pass filter. The output $\tilde{X}(f)$ of the equalizer circuit may then be provided as an input to the IDFT circuit 330-*a*.

The CP insertion module 335-*a* may be configured to insert a cyclic prefix in each of the time domain in-phase and quadrature streams $\tilde{x}_i(n)$ and $\tilde{x}_q(n)$ of the digital signal. The DAC/ADC module 340-*a* may then convert the time domain in-phase and quadrature streams to analog forms, and the analog forms of the in-phase and quadrature streams may be filtered using at least one low-pass filter included in the analog filter(s) 345-*a*. Thereafter, the in-phase and quadrature streams of the digital signal may be modulated on a single carrier signal y(n) using the I/Q modulator/demodulator 350-*a*, and the single carrier signal may be amplified by the power amplifier 355-*a* before transmission over a single-carrier wireless channel.

Figure 3B:
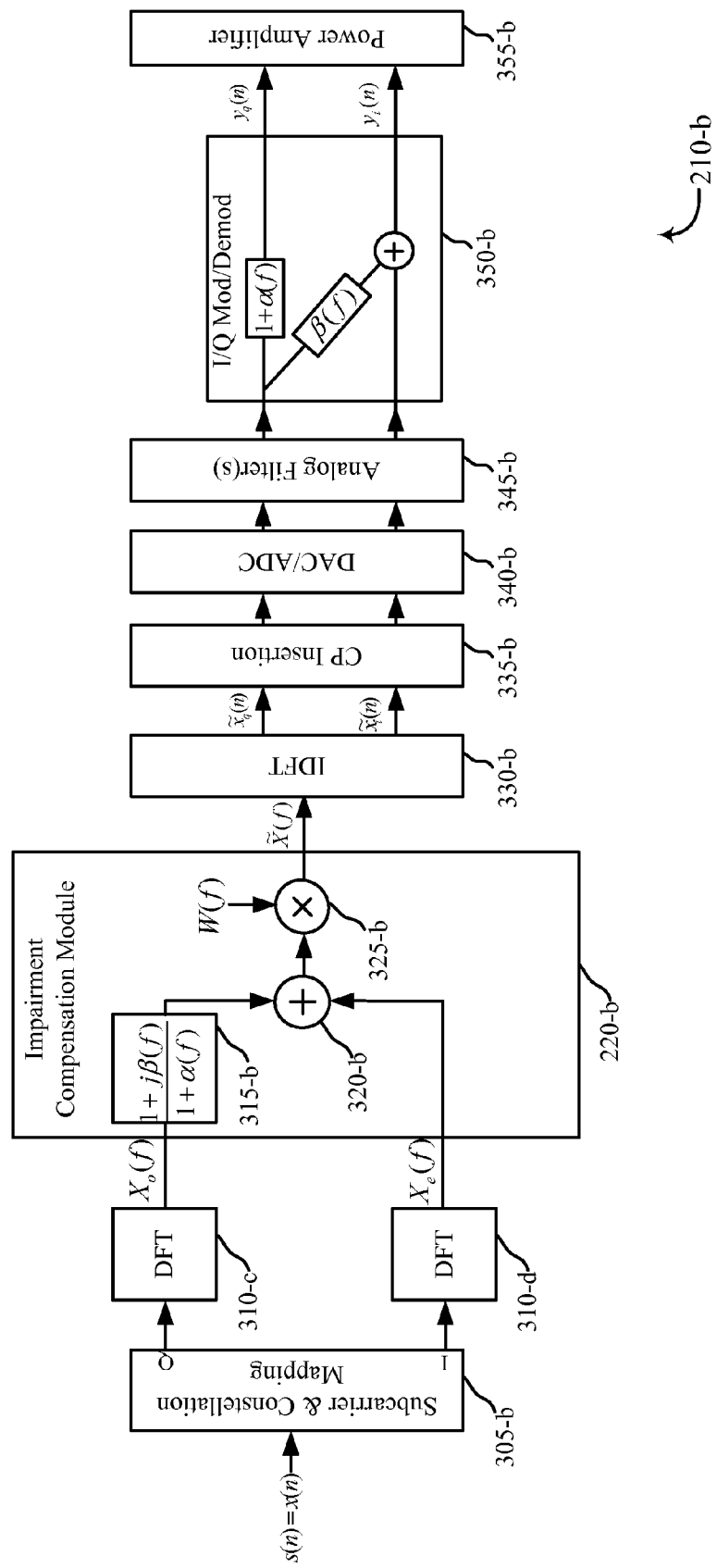
FIG. 3B is a block diagram illustrating another example of a wireless modem in accordance with various embodiments, wherein the wireless modem may be configured to transmit a signal over a single-carrier wireless channel.

FIG. 3B shows another wireless modem 210-*b* for processing a digital signal including a single carrier signal. The wireless modem 210-*b* may be an example of the wireless modem 210 shown in FIG. 2. The wireless modem 210-*b* may include a subcarrier and constellation mapping module 305-*b*, first and second DFT circuits 310-*c*, 310-*d*, an impairment compensation module 220-*b*, an IDFT circuit 330-*b*, a CP insertion module 335-*b*, a DAC/ADC module 340-*b*, analog filter(s) 345-*b*, an I/Q modulator/demodulator 350-*b*, and a power amplifier 355-*b*. Each of these components may be in communication with each other, directly or indirectly.

Turning first to the I/Q modulator/demodulator 350-*b*, the modulated single carrier signal y(n) output by the I/Q modulator/demodulator 350-*b* is shown to have a frequency dependent gain imbalance which may be expressed as 1+α(f) and a frequency dependent phase imbalance which may be expressed as β(f), where α includes a gain imbalance coefficient, β includes a phase imbalance coefficient, and f includes a frequency of a quadrature or odd component $y_q(n)$ of the single carrier signal y(n) (or simply a frequency of the signal y(n)). By way of example, the frequency dependent phase imbalance β(f) may be modeled with respect to the quadrature or odd component $y_q(n)$ of the single carrier signal. The frequency dependent gain imbalance and frequency dependent phase imbalance may be the I/Q impairments for which the impairment compensation module 220-*b* compensates.

The gain and phase imbalance coefficients may in some cases be determined by receiving at least one measurement of the transmit I/Q impairments associated with a single-carrier wireless channel on which the single carrier signal y(n) may be modulated, and then determining at least one or both of the gain imbalance coefficient or the phase imbalance coefficient based on the received at least one measurement.

Moving upstream in the transmit path through the wireless modem 210-*b*, the subcarrier and constellation mapping module 305-*b* may receive a time domain series of bits s(n)=x(n) representing a digital signal to be transmitted by the wireless modem 210-*b* on a single-carrier wireless channel (e.g., a wireless channel that employs a single carrier signal). The subcarrier and constellation mapping module 305-*b* may map the series of bits to in-phase and quadrature component streams (i.e., in-phase and quadrature components) that may be respectively received by the DFT circuits 310-*c*, 310-*d*. In certain examples, the DFT circuits 310-*c*, 310-*d* may be implemented by a digital signal processor configured to perform a separate Fast Fourier Transform (FFT) on each of the in-phase and quadrature components.

The first DFT circuit 310-*c* may be configured to transform a time domain version of a first one of the components of the digital signal (e.g., the quadrature or odd component) to a frequency domain version $X_o(f)$ of the first one of the components. Similarly, the second DFT circuit 310-*d* may be configured to transform a time domain version of a second one of the components of the digital signal (e.g., the in-phase or even component) to the frequency domain version $X_e(f)$ of the second one of the components.

The impairment compensation module 220-*b* may include a scalar module 315-*b*, an adder circuit 320-*b*, and/or a frequency domain equalizer circuit 325-*b*. The scalar module 315-*b* may be configured to scale the frequency domain version of the first one of the components $X_o(f)$ according to a frequency dependent I/Q impairment precompensation function to obtain a precompensated frequency domain version of the first one of the components. The scalar module 315-*b* may be configured to determine a frequency-dependent scalar for the component $X_o(f)$ as $$\frac{1 + j\beta(f)}{1 + \alpha(f)}$$

where f includes a frequency of the component $X_o(f)$, and where α and β are the respective gain and phase imbalance coefficients for the frequency f.

The adder circuit 320-*b* may be configured to combine the precompensated frequency domain version of the first one of the components with a frequency domain version of the second one of the components to produce a precompensated frequency domain version of the digital signal at the output of the adder circuit 320-*b*. The remaining components of the wireless modem 210-*b* (e.g., the frequency domain equalizer circuit 325-*b*, the IDFT circuit 330-*b*, the CP insertion module 335-*b*, the DAC/ADC module 340-*b*, the analog filter(s) 345-*b*, the I/Q modulator/demodulator 350-*b*, and the power amplifier 355-*b*) may be configured similarly to their corresponding components in FIG. 3A.

Figure 3C:
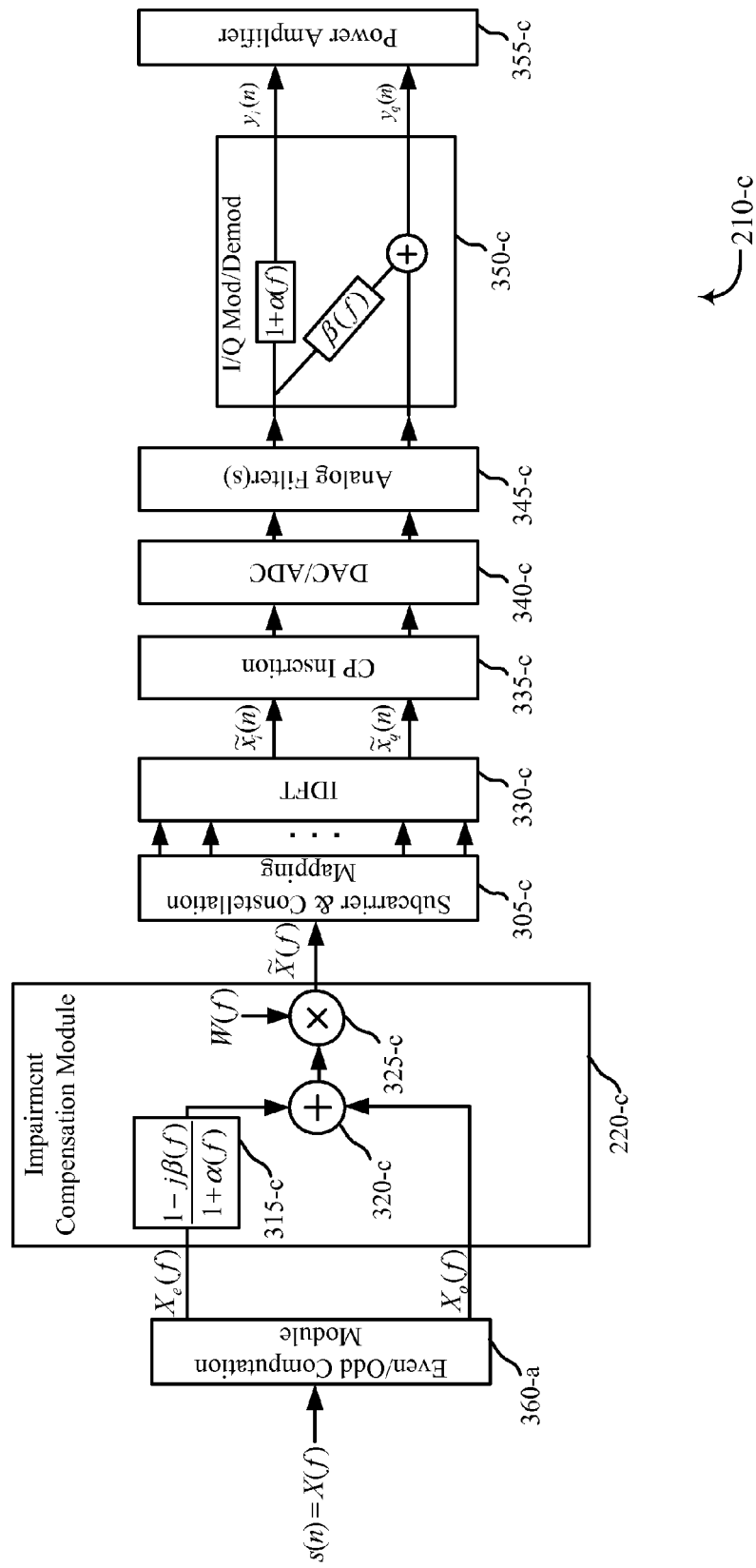
FIG. 3C is a block diagram illustrating another example of a wireless modem configured in accordance with various embodiments, wherein the wireless modem may be configured to transmit a signal over a single-carrier wireless channel.

FIG. 3C shows a wireless modem 210-*c* for processing a digital signal including an orthogonal frequency division multiplexed (OFDM) signal. The wireless modem 210-*c* may be an example of the wireless modem 210 shown in FIG. 2. The wireless modem 210-*c* may include an even/odd computation module 360-*a*, an impairment compensation module 220-*c*, a subcarrier and subcarrier and constellation mapping module 305-*c*, an inverse DFT (IDFT) circuit 330, a CP insertion module 335, a digital-to-analog/analog-to-digital converter (DAC) module 340-*c*, analog filter(s) 345-*c*, an I/Q modulator/demodulator 350-*c*, and a power amplifier 355. Each of these components may be in communication with each other, directly or indirectly.

Turning first to the even/odd computation module 360-*a*, the even/odd computation module 360-*a* may receive a frequency domain series of bits s(n)=X(f) representing a digital signal (e.g., an OFDM signal) to be transmitted by the wireless modem 210-*c* on an OFDM wireless channel. The even/odd computation module 360-*a* may compute the even component $X_e(f)$ of the OFDM signal X(f) as $$X_e(f) = \frac{1}{2}[X(f) + X^*(-f)];$$

where f includes a frequency of the component $X_e(f)$ (or simply a frequency of the OFDM signal X(f)). Similarly, the even/odd computation module 360-*a* may compute the odd component $X_o(f)$ of the OFDM signal X(f) as $$X_o(f) = \frac{1}{2}[X(f) - X^*(-f)];$$

where f includes a frequency of the component $X_o(f)$ (or simply a frequency of the OFDM signal X(f)).

The impairment compensation module 220-*c* may include a scalar module 315-*c*, an adder circuit 320-*c*, and/or a frequency domain equalizer circuit 325-*c*. The scalar module 315-*c* may be configured to scale the frequency domain version of a first one of the components $X_e$(f) according to a frequency dependent I/Q impairment precompensation function to obtain a precompensated frequency domain version of the first one of the components. The scalar module 315-*c* may be configured to determine a frequency-dependent scalar for the component $X_e(f)$ as $$\frac{1 - j\beta(f)}{1 + \alpha(f)}$$

where f includes a frequency of the component $X_e(f)$, and where α and β are the respective gain and phase imbalance coefficients for the frequency f.

The adder circuit 320-c may be configured to combine the precompensated frequency domain version of the first one of the components with a frequency domain version of a second one of the components (the odd component) to produce a precompensated frequency domain version of the digital signal at the output of the adder circuit 320-c.

Optionally, a frequency domain equalizer circuit 325-c may receive the output of the adder circuit 320-c and be configured (e.g., via a set of equalizer taps W(f)) to equalize, in the frequency domain, at least one or more of an in-band amplitude ripple associated with at least one analog low-pass filter of the wireless channel (e.g., at least one of the filters in the analog filter(s) 345-c) or an in-band phase ripple associated with the at least one analog low-pass filter. The output $\tilde{X}(f)$ of the equalizer circuit may then be provided as an input to the subcarrier and subcarrier and constellation mapping module 305-c.

The subcarrier and subcarrier and constellation mapping module 305-c may map the tones of the signal $\tilde{X}(f)$ to different OFDM subcarrier streams, which OFDM subcarrier streams may be received by the IDFT circuit 330-c.

The IDFT circuit 330-c may be configured to transform the subcarriers of the precompensated frequency domain version $\tilde{X}(f)$ of the digital signal to a time domain to produce a precompensated time domain version of the digital signal (e.g., $\tilde{x}_i(n)$ and $\tilde{x}_q(n)$).

The CP insertion module 335-c may be configured to insert a cyclic prefix in each of the time domain in-phase and quadrature streams $\tilde{x}_i(n)$ and $\tilde{x}_q(n)$ of the digital signal. The DAC/ADC module 340-c may then convert the time domain in-phase and quadrature streams to analog forms, and the analog forms of the in-phase and quadrature streams may be filtered using at least one low-pass filter included in the analog filter(s) 345-c. Thereafter, the in-phase and quadrature streams of the digital signal may be modulated on OFDM subcarriers using the I/Q modulator/demodulator 350-c and amplified by the power amplifier 355-c before transmission over an OFDM wireless channel.

Figure 3D:
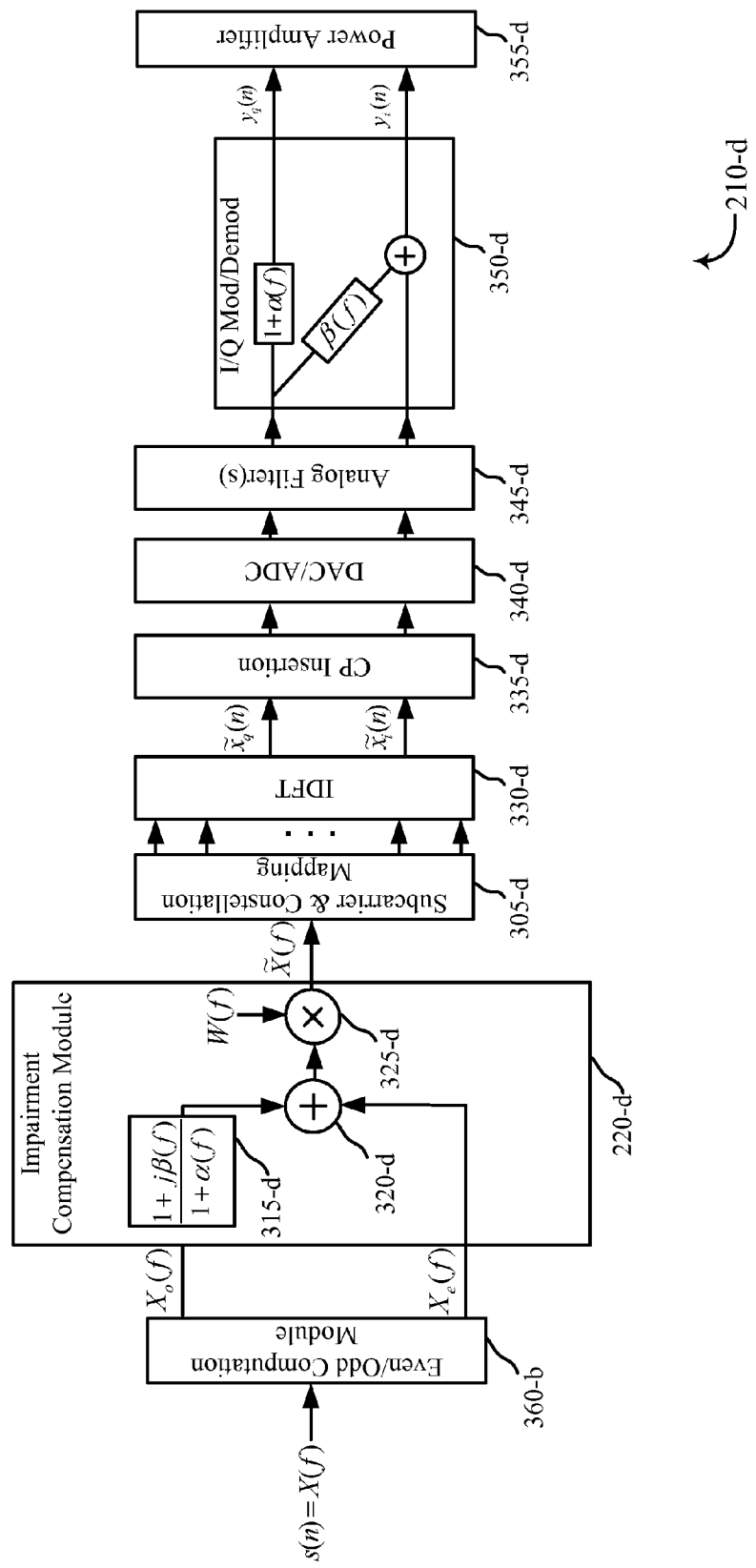
FIG. 3D is a block diagram illustrating another example of a wireless modem in accordance with various embodiments, wherein the wireless modem may be configured to transmit a signal over a single-carrier wireless channel.

FIG. 3D shows another wireless modem 210-d for processing a digital signal including an orthogonal frequency division multiplexed (OFDM) signal. The wireless modem 210-d may be an example of the wireless modem 210 shown in FIG. 2. The wireless modem 210-d may include an even/odd computation module 360-b, an impairment compensation module 220-d, a subcarrier and subcarrier and constellation mapping module 305-d, an inverse DFT (IDFT) circuit 330-d, a CP insertion module 335-d, a digital-to-analog/analog-to-digital converter (DAC/ADC) module 340-d, analog filter(s) 345-d, an I/Q modulator/demodulator 350-d, and a power amplifier 355-d. Each of these components may be in communication with each other, directly or indirectly.

Turning first to the even/odd computation module 360-b, the even/odd computation module 360-b may receive a frequency domain series of bits s(n)=X(f) representing a digital signal (e.g., an OFDM signal) to be transmitted by the wireless modem 210-d on an OFDM wireless channel. The even/odd computation module 360-b may compute the even component $X_e(f)$ of the OFDM signal X(f) as $$X_e(f)=\tfrac{1}{2}[X(f)+X^*(-f)];$$

where f includes a frequency of the component $X_e(f)$ (or simply a frequency of the OFDM signal X(f)). Similarly, the even/odd computation module 360-b may compute the odd component $X_o(f)$ of the OFDM signal X(f) as $$X_o(f)=\tfrac{1}{2}[X(f)-X^*(-f)];$$

where f includes a frequency of the component $X_o(f)$ (or simply a frequency of the OFDM signal X(f)).

The impairment compensation module 220-d may include a scalar module 315-d, an adder circuit 320-d, and/or a frequency domain equalizer circuit 325-d. The scalar module 315-d may be configured to scale the frequency domain version of a first one of the components $X_o(f)$ according to a frequency dependent I/Q impairment precompensation function to obtain a precompensated frequency domain version of the first one of the components. The scalar module 315-d may be configured to determine a frequency-dependent scalar for the component $X_o(f)$ as $$\frac{1+j\beta(f)}{1+\alpha(f)}$$

where f includes a frequency of the component $X_o(f)$, and where α and β are the respective gain and phase imbalance coefficients for the frequency f.

The adder circuit 320-d may be configured to combine the precompensated frequency domain version of the first one of the components with a frequency domain version of a second one of the components (the even component) to produce a precompensated frequency domain version of the digital signal at the output of the adder circuit 320-d. The remaining components of the wireless modem 210-d (e.g., the frequency domain equalizer circuit 325-d, the subcarrier and subcarrier and constellation mapping module 305-d, the IDFT circuit 330-d, the CP insertion module 335-d, the DAC/ADC module 340-d, the analog filter(s) 345-d, the I/Q modulator/demodulator 350-d, and the power amplifier 355-d) may be configured similarly to their corresponding components in FIG. 3C.

Figure 4A:
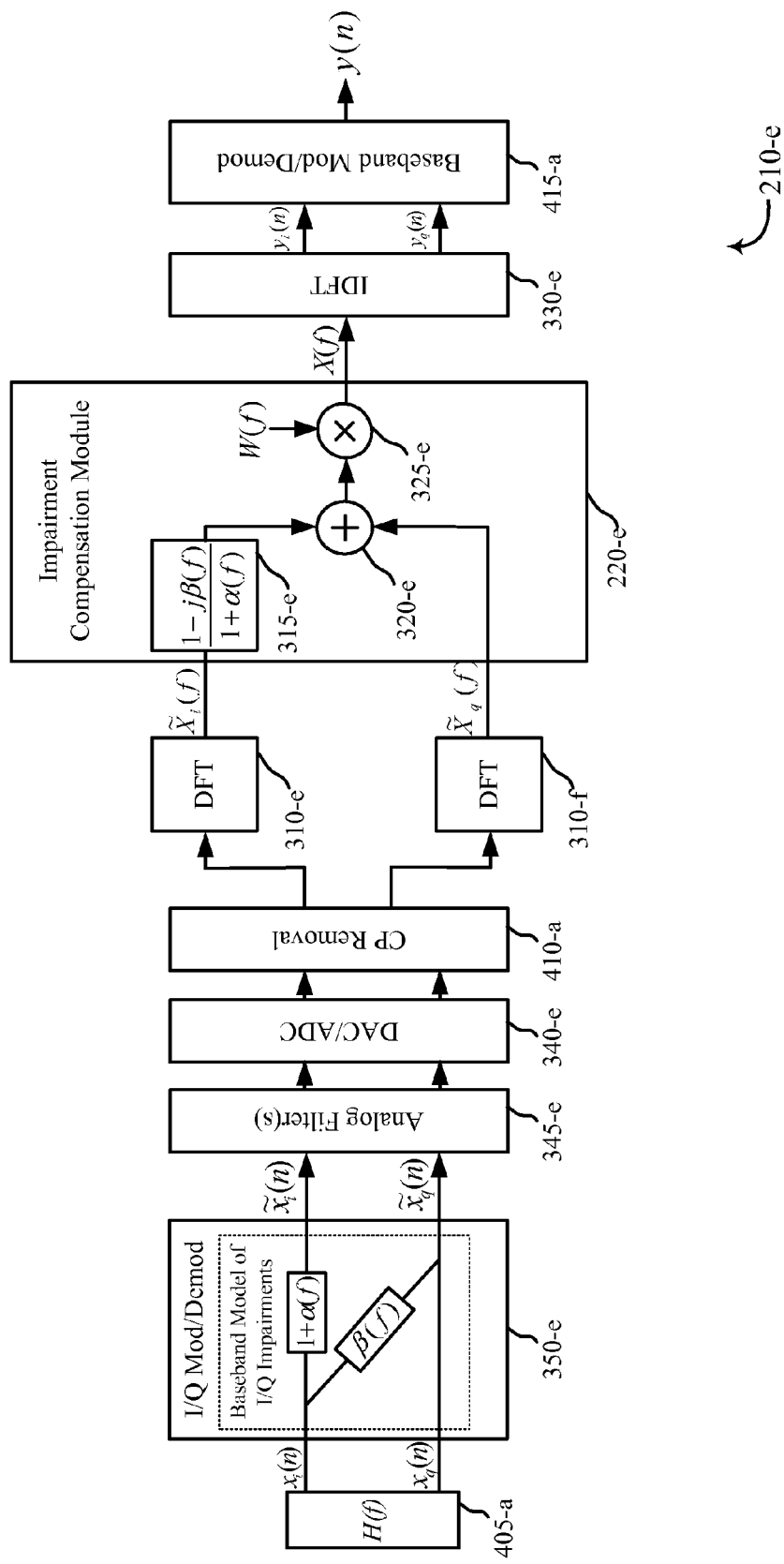
FIG. 4A is a block diagram illustrating one example of a wireless modem in accordance with various embodiments, wherein the wireless modem may be configured to receive a signal over an OFDM wireless channel.

FIG. 4A, for example, shows a wireless modem 210-e for processing a digital signal including a single carrier signal. The wireless modem 210-e may be an example of the wireless modem 210 shown in FIG. 2. The wireless modem 210-e may receive an input signal on the output of a wireless channel 405-a having a baseband equivalent frequency response H(f), an I/Q modulator/demodulator 350-e, analog filter(s) 345-e, an analog-to-digital converter (ADC) 340-e, a cyclic prefix (CP) removal module 410-a, a plurality of discrete Fourier transform (DFT) circuits 310-e, 310-f, an impairment compensation module 220-e, an inverse DFT (IDFT) circuit 330-e, and a baseband modulator/demodulator 415-a Each of these components may be in communication with each other, directly or indirectly.

The input from the wireless channel 405-a may be communicatively coupled with one or more antenna ports and output a received modulated single-carrier analog signal having an in-phase component $x_i(n)$ and a quadrature component $x_q(n)$ to the I/Q modulator/demodulator 350-e, which may demodulate the analog signal into the analog in-phase and quadrature components $\tilde{X}_i(n)$ and $\tilde{X}_q(n)$ of the single carrier signal. As a result of the demodulation, the single carrier signal is shown to have a frequency dependent gain imbalance which may be expressed as 1+α(f) and a frequency dependent phase imbalance which may be expressed as β(f), where a includes a gain imbalance coefficient, β includes a phase imbalance coefficient, and f includes a frequency of the in-phase component $x_i(n)$ of the single carrier signal (or simply a frequency of the single carrier signal). By way of example, the frequency dependent gain imbalance α(f) and phase imbalance β(f) may be modeled with respect to the in-phase component $x_i(n)$ of the single carrier signal. The frequency dependent gain imbalance and frequency dependent phase imbalance may be the I/Q imbalances for which the impairment compensation module 220-*e* compensates.

The gain and phase imbalance coefficients may in some cases be determined by receiving at least one measurement of receiver I/Q imbalance associated with a single-carrier wireless channel on which the single carrier signal is received, and then determining at least one or both of the gain imbalance coefficient or the phase imbalance coefficient based on the received at least one measurement.

The separate analog in-phase and quadrature components $\tilde{X}_i(n)$ and $\tilde{X}_q(n)$ of the single carrier signal may be received and filtered using at least one low-pass filter included in the analog filter(s) 345-*e*. Thereafter, the analog-to-digital converter (ADC) 340-*e* may digitize the separate analog in-phase and quadrature components of the single carrier signal, and the CP removal module 410-*a* may remove a cyclic prefix from each of the digitized in-phase and quadrature components of the single carrier signal.

A first DFT circuit 310-*e* may be configured to transform a time domain version of the in-phase component of the single carrier signal to a frequency domain version $\tilde{X}_i(f)$ of the in-phase component. Separately, a second DFT circuit 310-*f* may be configured to transform a time domain version of the quadrature component of the single carrier signal to a frequency domain version $\tilde{X}_q(f)$ of the quadrature component. In certain examples, the DFT circuits 310-*e*, 310-*f* may be implemented by one or more digital signal processors configured to perform Fast Fourier Transforms (FFTs) on time domain versions of the components of the single carrier signal. The frequency domain versions of the in-phase and quadrature components respectively represent the even and odd spectra of the single carrier signal, namely $$\tilde{X}_i(f)=\tilde{X}_e(f)=\tfrac{1}{2}[\tilde{X}(f)+\tilde{X}^*(-f)];$$

and $$\tilde{X}_q(f)=\tilde{X}_o(f)=\tfrac{1}{2}[\tilde{X}(f)-\tilde{X}^*(-f)];$$

where f includes a frequency of the component $\tilde{X}_e(f)$ (or simply a frequency of the single carrier signal).

The impairment compensation module 220-*f* may include a scalar module 315-*e*, an adder circuit 320-*e*, and/or a frequency domain equalizer circuit 325-*e*. The scalar module 315-*e* may be configured to scale the frequency domain version of a first one of the components of the single carrier signal (e.g., the in-phase component $\tilde{X}_i(f)$) according to a frequency dependent imbalance compensation function to obtain an imbalance compensated frequency domain version of the first one of the components. The scalar module 315-*e* may be configured to determine a frequency-dependent scalar for the component as $$\frac{1-j\beta(f)}{1+\alpha(f)}$$

where f includes a frequency of the component $\tilde{X}_i(f)$, and where α and β are the respective gain and phase imbalance coefficients for the frequency f.

The adder circuit 320-*e* may be configured to combine the imbalance compensated frequency domain version of the first one of the components (e.g., the in-phase component) with the frequency domain version of the second one of the components (e.g., the quadrature component) to produce an imbalance compensated frequency domain version of the single carrier signal at the output of the adder circuit 320-*e*.

The IDFT circuit 330-*e* may be configured to transform the imbalance compensated frequency domain version X(f) of the single carrier signal to a time domain to produce an imbalance compensated time domain version of the single carrier signal (e.g., $x_i(n)$ and $x_q(n)$). In certain examples, the IDFT circuit 330-*e* may be implemented by a digital signal processor configured to perform an inverse Fast Fourier Transform (IFFT) on the imbalance compensated frequency domain version X(f) of the digital signal. Optionally, a frequency domain equalizer circuit may be disposed between and communicatively coupled with an output of the adder circuit 320-*e* and the IDFT circuit 330-*e*, such that the IDFT circuit 330-*e* may be configured to transform an equalized imbalance compensated frequency domain version of the single carrier signal to the time domain. The frequency domain equalizer circuit 325-*e* may receive an output of the adder circuit 320-*e* and be configured (e.g., via a set of equalizer taps W(f)) to equalize, in the frequency domain, at least one or more of an in-band amplitude ripple or an in-band phase ripple. The in-band amplitude ripple or in-band phase ripple may be associated with at least one analog low-pass filter (e.g., at least one of the filters in the analog filter(s) 345-*e*) of the receive path of the wireless modem 210-*e* and/or with the wireless channel. The output X(f) of the frequency domain equalizer circuit 325-*e* may then be provided as an input to the IDFT circuit 330-*e*.

A baseband modulator/demodulator 415-*a* may be communicatively coupled with an output of the IDFT circuit 330-*e* to perform baseband demodulation of an output $y_i(n)$, $y_q(n)$ of the IDFT circuit 330-*e*, thereby producing the output stream y(n).

Figure 4B:
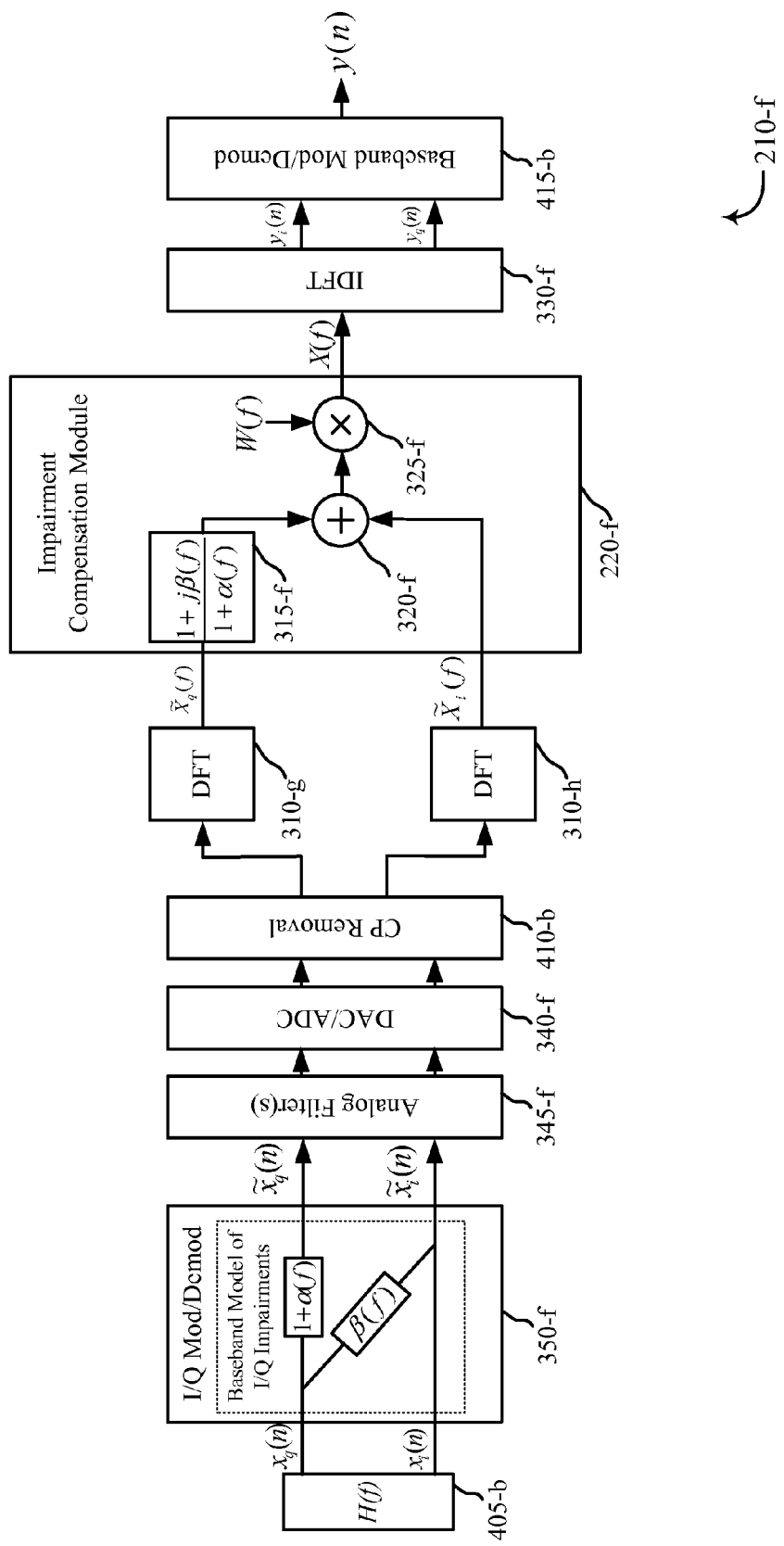
FIG. 4B is a block diagram illustrating another example of a wireless modem in accordance with various embodiments, wherein the wireless modem may be configured to receive a signal over an OFDM wireless channel.

FIG. 4B shows a wireless modem 210-*f* for processing a digital signal including a single carrier signal. The wireless modem 210-*f* may be an example of the wireless modem 210 shown in FIG. 2. The wireless modem 210-*f* may receive an input from a wireless channel 405-*b* having a frequency response H(f), an I/Q modulator/demodulator 350-*f*, analog filter(s) 345, an analog-to-digital converter (ADC) 340-*f*, a cyclic prefix (CP) removal module 410-*b*, a plurality of discrete Fourier transform (DFT) circuits 310-*g*, 310-*h*, an impairment compensation module 220-*f*, an inverse DFT (IDFT) circuit 330-*f*, and a baseband modulator/demodulator 415-*b*. Each of these components may be in communication with each other, directly or indirectly.

The wireless channel 405-*b* may be communicatively coupled with one or more antenna ports and output a received single-carrier analog signal having an in-phase component $x_i(n)$ and a quadrature component $x_q(n)$ to the I/Q modulator/demodulator 350-*f*. The I/Q modulator/demodulator 350-*f* may demodulate the analog signal into the analog in-phase and quadrature components $\tilde{X}_i(n)$ and $\tilde{X}_q(n)$ of the single carrier signal. As a result of the demodulation, the single carrier signal is shown to have a frequency dependent gain imbalance which may be expressed as 1+α(f) and a frequency dependent phase imbalance which may be expressed as β(f), where α includes a gain imbalance coefficient, β includes a phase imbalance coefficient, and f includes a frequency of the quadrature component $x_q(n)$ of the single carrier signal (or simply a frequency of the single carrier signal). By way of example, the frequency dependent gain imbalance α(f) and phase imbalance β(f) may be modeled with respect to the quadrature component $x_q(n)$ of the single carrier signal. The frequency dependent gain imbalance and frequency dependent phase imbalance may be the I/Q imbalances for which the impairment compensation module 220-*f* compensates.

The gain and phase imbalance coefficients may in some cases be determined by receiving at least one measurement of receiver I/Q imbalance associated with a single-carrier wireless channel on which the single carrier signal is received, and then determining at least one or both of the gain imbalance coefficient or the phase imbalance coefficient based on the received at least one measurement.

The separate analog in-phase and quadrature components $\tilde{X}_i(n)$ and $\tilde{X}_q(n)$ of the single carrier signal may be received and filtered using at least one low-pass filter included in the analog filter(s) 345-*f*. Thereafter, the analog-to-digital converter (ADC) 345-*f* may digitize the separate analog in-phase and quadrature components of the single carrier signal, and the CP removal module 410-*b* may remove a cyclic prefix from each of the digitized in-phase and quadrature components of the single carrier signal.

A first DFT circuit 310-*g* may be configured to transform a time domain version of the in-phase component of the single carrier signal to a frequency domain version $\tilde{X}_q(f)$ of the quadrature component. Separately, a second DFT circuit 310-*h* may be configured to transform a time domain version of the in-phase component of the single carrier signal to a frequency domain version $\tilde{X}_i(f)$ of the in-phase component. In certain examples, the DFT circuits 310-*g*, 310-*h* may be implemented by one or more digital signal processors configured to perform Fast Fourier Transforms (FFTs) on time domain versions of the components of the single carrier signal. The frequency domain versions of the in-phase and quadrature components respectively represent the even and odd spectra of the single carrier signal, namely $$\tilde{X}_i(f) = \tilde{X}_e(f) = \tfrac{1}{2}[\tilde{X}(f) + \tilde{X}^*(-f)];$$

and $$\tilde{X}_q(f) = \tilde{X}_o(f) = \tfrac{1}{2}[\tilde{X}(f) - \tilde{X}^*(-f)];$$

where f includes a frequency of the component $\tilde{X}_e(f)$ (or simply a frequency of the single carrier signal).

The impairment compensation module 220-*f* may include a scalar module 315-*f*, an adder circuit 320-*f*, and/or a frequency domain equalizer circuit 325-*f*. The scalar module 315-*f* may be configured to scale the frequency domain version of a first one of the components of the single carrier signal (e.g., the quadrature component $\tilde{X}_q(f)$) according to a frequency dependent imbalance compensation function to obtain an imbalance compensated frequency domain version of the first one of the components. The scalar module 315-*f* may be configured to determine a frequency-dependent scalar for the component as $$\frac{1 + j\beta(f)}{1 + \alpha(f)}$$

where f includes a frequency of the component $\tilde{X}_q(f)$, and where α and β are the respective gain and phase imbalance coefficients for the frequency f.

The adder circuit 320-*f* may be configured to combine the imbalance compensated frequency domain version of the first one of the components (e.g., the quadrature component) with the frequency domain version of the second one of the components (e.g., the in-phase component) to produce an imbalanced compensated frequency domain version of the single carrier signal at the output of the adder circuit 320-*f*.

The IDFT circuit 330-*f* may be configured to transform the imbalance compensated frequency domain version X(f) of the single carrier signal to a time domain to produce an imbalance compensated time domain version of the single carrier signal (e.g., $x_i(n)$ and $x_q(n)$). In certain examples, the IDFT circuit 330-*f* may be implemented by a digital signal processor configured to perform an inverse Fast Fourier Transform (IFFT) on the imbalance compensated frequency domain version X(f) of the digital signal. Optionally, a frequency domain equalizer circuit 325-*f* may be disposed between and communicatively coupled with an output of the adder circuit 320-*f* and the IDFT circuit 330-*f*, such that the IDFT circuit 330-*f* may be configured to transform an equalized imbalance compensated frequency domain version of the single carrier signal to the time domain. The frequency domain equalizer circuit 325-*f* may receive an output of the adder circuit 320-*f* and be configured (e.g., via a set of equalizer taps W(f)) to equalize, in the frequency domain, at least one or more of an in-band amplitude ripple or an in-band phase ripple. The in-band amplitude ripple or in-band phase ripple may be associated with at least one analog low-pass filter (e.g., at least one of the filters in the analog filter(s) 345-*f*) of the receive path of the wireless modem 210-*f* and/or with the wireless channel. The output X(f) of the frequency domain equalizer circuit 325-*f* may then be provided as an input to the IDFT circuit 330-*f*.

A baseband modulator/demodulator 415-*b* may be communicatively coupled with an output of the IDFT circuit 330-*f* to perform baseband demodulation of an output $y_i(n)$, $y_q(n)$ of the IDFT circuit 330-*f*, thereby producing the output stream y(n).

Figure 4C:
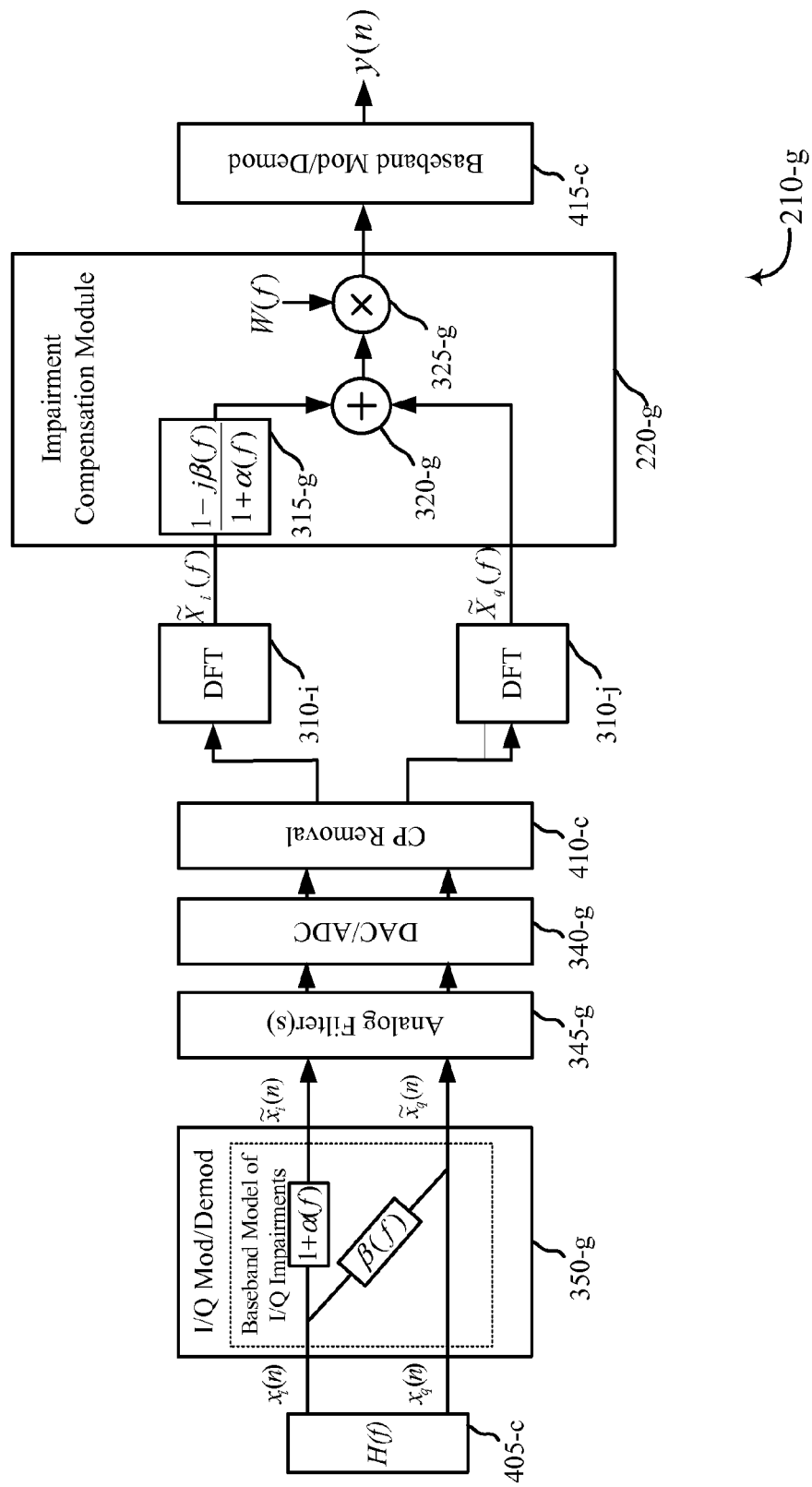
FIG. 4C is a block diagram illustrating another example of a wireless modem in accordance with various embodiments, wherein the wireless modem may be configured to receive a signal over an OFDM wireless channel.

FIG. 4C shows a wireless modem 210-*g* for processing a digital signal including an OFDM signal. The wireless modem 210-*g* may be an example of the wireless modem 210 shown in FIG. 2. The wireless modem 210-*g* may receive an input from a wireless channel 405-*c* having a frequency response H(f), an I/Q modulator/demodulator 350-*g*, analog filter(s) 345-*g*, an analog-to-digital converter (ADC) 340-*g*, a cyclic prefix (CP) removal module 410-*c*, a plurality of discrete Fourier transform (DFT) circuits 310-*i*, 310-*j*, an impairment compensation module 220-*g*, and a baseband modulator/demodulator 415-*g*. Each of these components may be in communication with each other, directly or indirectly.

The wireless channel 405-*c* may be communicatively coupled with one or more antenna ports and output a received OFDM analog signal having an in-phase component $x_i(n)$ and a quadrature component $x_q(n)$ to the I/Q modulator/demodulator 350-*g*. The I/Q modulator/demodulator 350-*g* may demodulate the analog signal into the analog in-phase and quadrature components $\tilde{X}_i(n)$ and $\tilde{X}_q(n)$ of the OFDM signal. As a result of the demodulation, the OFDM signal is shown to have a frequency dependent gain imbalance which may be expressed as 1+α(f) and a frequency dependent phase imbalance which may be expressed as β(f), where α includes a gain imbalance coefficient, β includes a phase imbalance coefficient, and f includes a frequency of the in-phase component $x_i(n)$ of the OFDM signal (or simply a frequency of the OFDM signal). By way of example, the frequency dependent gain imbalance α(f) and phase imbalance β(f) may be modeled with respect to the in-phase component $x_i(n)$ of the OFDM signal. The frequency dependent gain imbalance and frequency dependent phase imbalance may be the I/Q imbalances for which the impairment compensation module 220-*g* compensates.

The gain and phase imbalance coefficients may in some cases be determined by receiving at least one measurement of receiver I/Q imbalance associated with an OFDM wireless channel on which the OFDM signal is received, and then determining at least one or both of the gain imbalance coefficient or the phase imbalance coefficient based on the received at least one measurement.

The separate analog in-phase and quadrature components $\tilde{X}_i(n)$ and $\tilde{X}_q(n)$ of the OFDM signal may be received and filtered using at least one low-pass filter included in the analog filter(s) 345-g. Thereafter, the analog-to-digital converter (ADC) 340-g may digitize the separate analog in-phase and quadrature components of the OFDM signal, and the CP removal module 410-g may remove a cyclic prefix from each of the digitized in-phase and quadrature components of the OFDM signal.

A first DFT circuit 310-i may be configured to transform a time domain version of the in-phase component of the OFDM signal to a frequency domain version $\tilde{X}_i(f)$ of the in-phase component. Separately, a second DFT circuit 310-j may be configured to transform a time domain version of the quadrature component of the OFDM signal to a frequency domain version $\tilde{X}_q(f)$ of the quadrature component. In certain examples, the DFT circuits 310-i, 310-j may be implemented by one or more digital signal processors configured to perform Fast Fourier Transforms (FFTs) on time domain versions of the components of the OFDM signal. The frequency domain versions of the in-phase and quadrature components respectively represent the even and odd spectra of the OFDM signal, namely $$\tilde{X}_i(f) = \tilde{X}_e(f) = \tfrac{1}{2}[\tilde{X}(f) + \tilde{X}^*(-f)];$$

and $$\tilde{X}_q(f) = \tilde{X}_o(f) = \tfrac{1}{2}[\tilde{X}(f) - \tilde{X}^*(-f)];$$

where f includes a frequency of the component $\tilde{X}_e(f)$ (or simply a frequency of the OFDM signal).

The impairment compensation module 220-g may include a scalar module 315-g, an adder circuit 320-g, and/or a frequency domain equalizer circuit 325-g. The scalar module 315-g may be configured to scale the frequency domain version of a first one of the components of the OFDM signal (e.g., the in-phase component $\tilde{X}_i(f)$) according to a frequency dependent imbalance compensation function to obtain an imbalance compensated frequency domain version of the first one of the components. The scalar module 315-g may be configured to determine a frequency-dependent scalar for the component as $$\frac{1 - j\beta(f)}{1 + \alpha(f)}$$

where f includes a frequency of the component $\tilde{X}_i(f)$, and where $\alpha$ and $\beta$ are the respective gain and phase imbalance coefficients for the frequency f.

The adder circuit 320-g may be configured to combine the imbalance compensated frequency domain version of the first one of the components (e.g., the in-phase component) with the frequency domain version of the second one of the components (e.g., the quadrature component) to produce an imbalanced compensated frequency domain version of the OFDM signal at the output of the adder circuit 320-g.

Optionally, a frequency domain equalizer circuit 325-g may be communicatively coupled with an output of the adder circuit 320-g. The frequency domain equalizer circuit 325-g may receive an output of the adder circuit 320-g and be configured (e.g., via a set of equalizer taps W(f)) to equalize, in the frequency domain, at least one or more of an in-band amplitude ripple or an in-band phase ripple. The in-band amplitude ripple or in-band phase ripple may be associated with at least one analog low-pass filter (e.g., at least one of the filters in the analog filter(s) 345-g) of the receive path of the wireless modem 210-g and/or with the wireless channel.

A baseband modulator/demodulator 415-c may be communicatively coupled with an output of the adder circuit 320-g, possibly through the optional frequency domain equalizer circuit 325-g, to perform baseband demodulation of the output of the adder circuit 320-g and produce an output stream y(n). Due to the nature of OFDM demodulation, the output of the adder circuit 320-g need not be transformed back to the time domain before baseband demodulation. Rather, the in-phase and quadrature outputs of the DFTs may represent multiple complex time-domain samples associated with different subcarriers, and the output of the adder circuit 320-g may represent these complex time-domain samples as compensated for I/Q imbalances and equalized for the passband characteristics of the analog filter(s) 345-g.

Figure 4D:
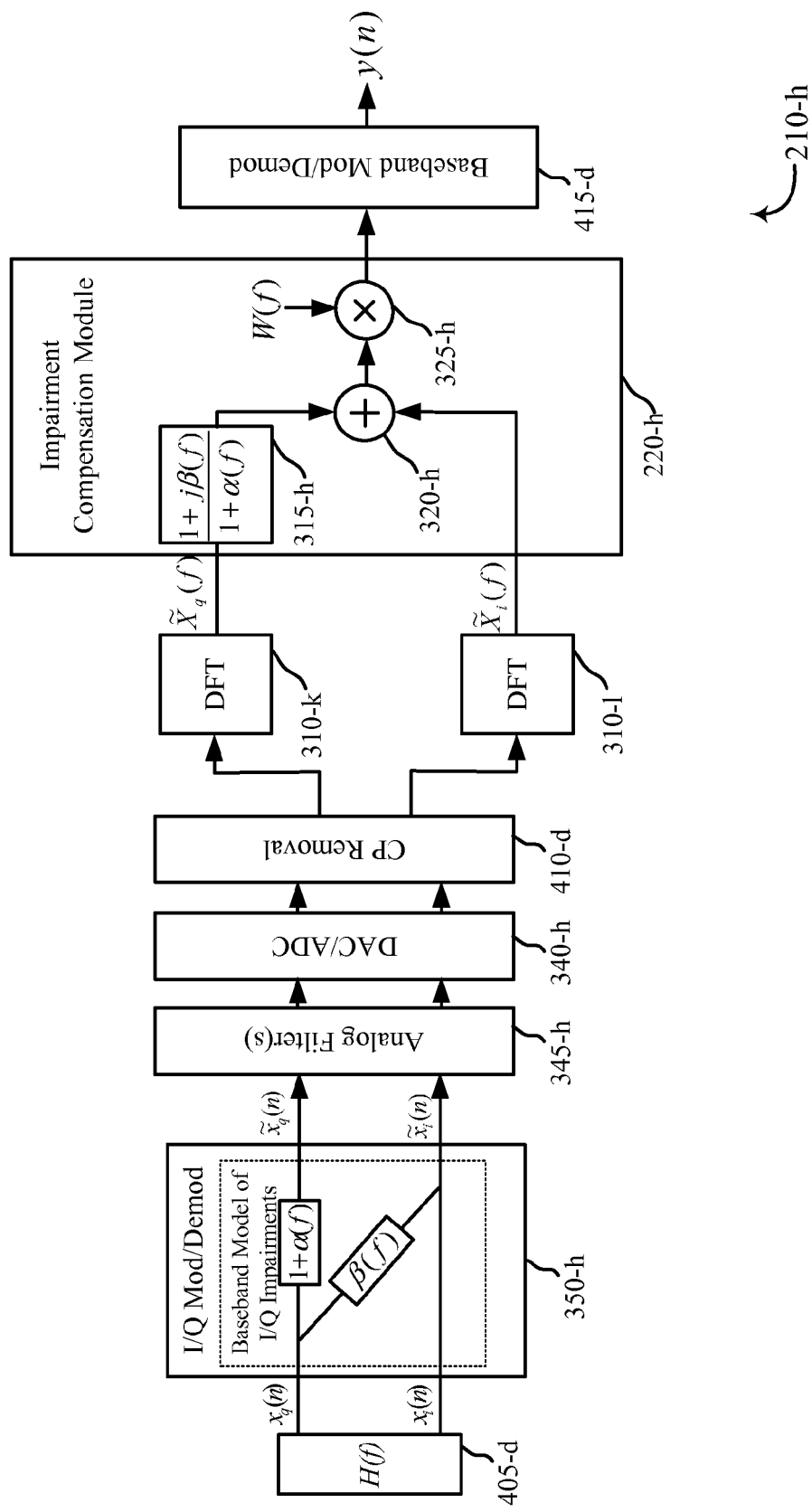
FIG. 4D is a block diagram illustrating another example of a wireless modem in accordance with various embodiments, wherein the wireless modem may be configured to receive a signal over an OFDM wireless channel.

FIG. 4D, for example, shows a wireless modem 210-h for processing a digital signal including an OFDM signal. The wireless modem 210-h may receive an input from a wireless channel 405-h having a frequency response H(f), an I/Q modulator/demodulator 350-h, analog filter(s) 345-h, an analog-to-digital converter (ADC) 340-h, a cyclic prefix (CP) removal module 410-d, a plurality of discrete Fourier transform (DFT) circuits 310-k, 310-1, an impairment compensation module 220-h, an inverse DFT (IDFT) circuit 330-h, and a baseband modulator/demodulator 415-d. Each of these components may be in communication with each other, directly or indirectly.

The wireless channel 405-d may be communicatively coupled with one or more antenna ports and output a received OFDM analog signal having an in-phase component $x_i(n)$ and a quadrature component $x_q(n)$ to the I/Q modulator/demodulator 350-h. The I/Q modulator/demodulator 350-h may demodulate the analog signal into the analog in-phase and quadrature components $\tilde{X}_i(n)$ and $\tilde{X}_q(n)$ of the OFDM signal. As a result of the demodulation, the OFDM signal is shown to have a frequency dependent gain imbalance which may be expressed as $1+\alpha(f)$ and a frequency dependent phase imbalance which may be expressed as $\beta(f)$, where $\alpha$ includes a gain imbalance coefficient, $\beta$ includes a phase imbalance coefficient, and f includes a frequency of the quadrature component $x_q(n)$ of the OFDM signal (or simply a frequency of the OFDM signal). By way of example, the frequency dependent gain imbalance $\alpha(f)$ and phase imbalance $\beta(f)$ may be modeled with respect to the quadrature component $x_q(n)$ of the OFDM signal. The frequency dependent gain imbalance and frequency dependent phase imbalance may be the I/Q imbalances for which the impairment compensation module 220-h compensates.

The gain and phase imbalance coefficients may in some cases be determined by receiving at least one measurement of receiver I/Q imbalance associated with a single-carrier wireless channel on which the OFDM signal is received, and then determining at least one or both of the gain imbalance coefficient or the phase imbalance coefficient based on the received at least one measurement.

The separate analog in-phase and quadrature components $\tilde{X}_i(n)$ and $\tilde{X}_q(n)$ of the OFDM signal may be received and filtered using at least one low-pass filter included in the analog filter(s) 345-h. Thereafter, the analog-to-digital converter (ADC) 340-h may digitize the separate analog in-phase and quadrature components of the OFDM signal, and the CP removal module 410-d may remove a cyclic prefix from each of the digitized in-phase and quadrature components of the OFDM signal.

A first DFT circuit 310-k may be configured to transform a time domain version of the in-phase component of the OFDM signal to a frequency domain version $\tilde{X}_q(f)$ of the quadrature component. Separately, a second DFT circuit 310-1 may be configured to transform a time domain version of the in-phase component of the OFDM signal to a frequency domain version $\tilde{X}_i(f)$ of the in-phase component. In certain examples, the DFT circuits 310-k, 310-1 may be implemented by one or more digital signal processors configured to perform Fast Fourier Transforms (FFTs) on time domain versions of the components of the OFDM signal. The frequency domain versions of the in-phase and quadrature components respectively represent the even and odd spectra of the OFDM signal, namely $$\tilde{X}_i(f) = \tilde{X}_e(f) = \tfrac{1}{2}[\tilde{X}(f) + \tilde{X}^*(-f)];$$

and $$\tilde{X}_q(f) = \tilde{X}_o(f) = \tfrac{1}{2}[\tilde{X}(f) - \tilde{X}^*(-f)];$$

where f includes a frequency of the component $\tilde{X}_e(f)$ (or simply a frequency of the OFDM signal).

The impairment compensation module 220-h may include a scalar module 315-h, an adder circuit 320-h, and/or a frequency domain equalizer circuit 325-h. The scalar module 315-h may be configured to scale the frequency domain version of a first one of the components of the OFDM signal (e.g., the quadrature component $\tilde{X}_q(f)$) according to a frequency dependent imbalance compensation function to obtain an imbalance compensated frequency domain version of the first one of the components. The scalar module 315-h may be configured to determine a frequency-dependent scalar for the component as $$\frac{1 + j\beta(f)}{1 + \alpha(f)}$$

where f includes a frequency of the component $\tilde{X}_q(f)$, and where α and β are the respective gain and phase imbalance coefficients for the frequency f.

The adder circuit 320-h may be configured to combine the imbalance compensated frequency domain version of the first one of the components (e.g., the quadrature component) with the frequency domain version of the second one of the components (e.g., the in-phase component) to produce an imbalance compensated frequency domain version of the OFDM signal at the output of the adder circuit 320-h.

Optionally, a frequency domain equalizer circuit 325-h may be communicatively coupled with an output of the adder circuit 320-h. The frequency domain equalizer circuit 325-h may receive an output of the adder circuit 320-h and be configured (e.g., via a set of equalizer taps W(f)) to equalize, in the frequency domain, at least one or more of an in-band amplitude ripple or an in-band phase ripple. The in-band amplitude ripple or in-band phase ripple may be associated with at least one analog low-pass filter (e.g., at least one of the filters in the analog filter(s) 345-h) of the receive path of the wireless modem 210-h and/or with the wireless channel.

A baseband modulator/demodulator 415-d may be communicatively coupled with an output of the adder circuit 320-h, possibly through the optional frequency domain equalizer circuit 325-h, to perform baseband demodulation of the output of the adder circuit 320-h and produce an output stream y(n). Due to the nature of OFDM demodulation, the output of the adder circuit 320-h need not be transformed back to the time domain before baseband demodulation. Rather, the in-phase and quadrature outputs of the DFTs may represent multiple complex time-domain samples associated with different subcarriers, and the output of the adder circuit 320-h may represent these complex time-domain samples as compensated for I/Q imbalances and equalized for the passband characteristics of the analog filter(s) 345-h.

Figure 5:
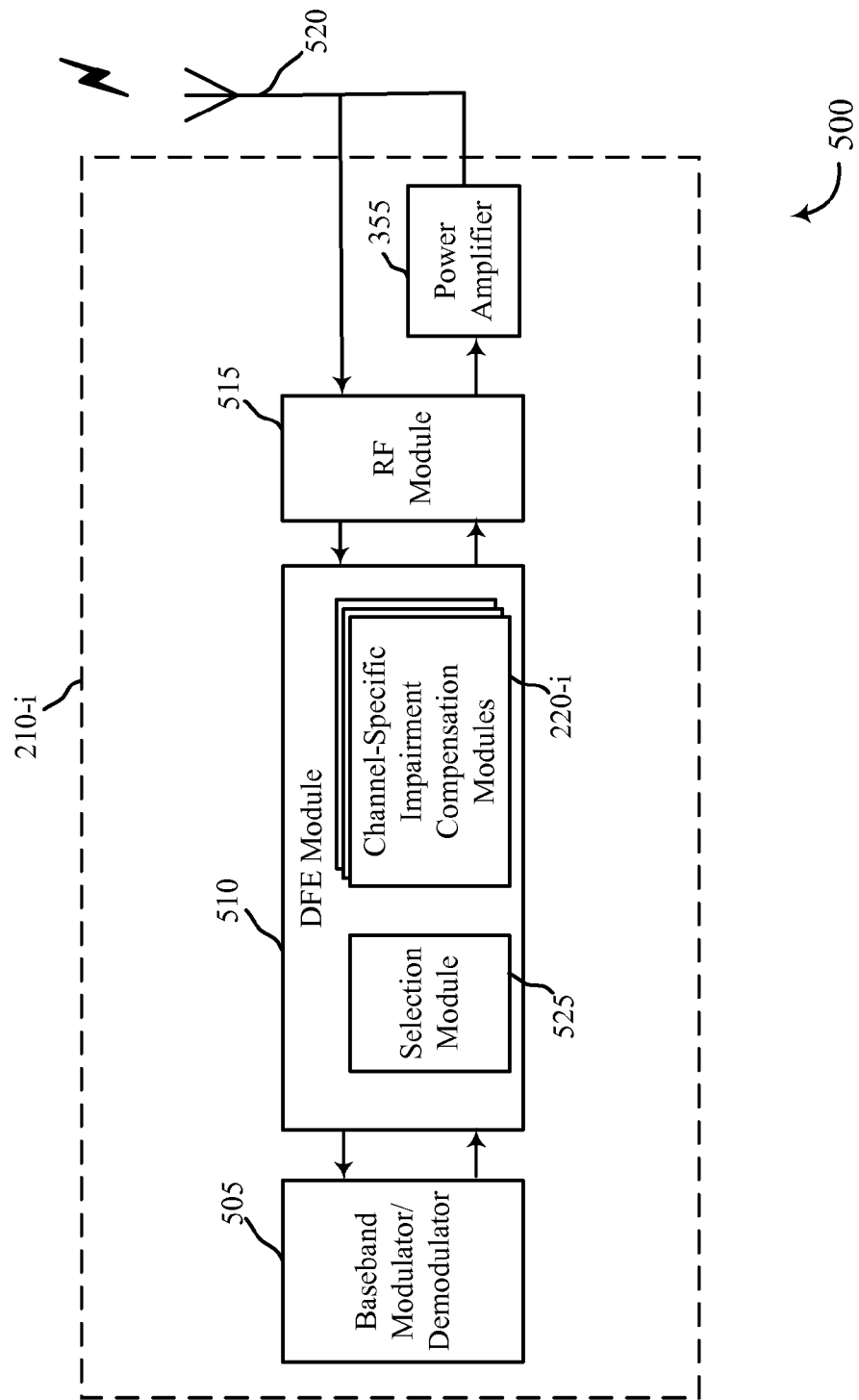
FIG. 5 is a block diagram illustrating an example of a transmit/receive path of a wireless modem in accordance with various embodiments.

FIG. 5 is a block diagram 500 illustrating one embodiment of a transmit and receive path of a wireless modem 210-i. The wireless modem 210-i may be an example of one or more of the wireless modems 210 described in FIG. 2, 3A, 3B, 3C, 3D, 4A, 4B, 4C and/or 4D. In one example, the wireless modem 210-i may include a baseband modulator/demodulator 505, a digital front end (DFE) module 510, a radio frequency (RF) module 515, a power amplifier (PA) 355, and at least one antenna 520. Each of these components may be in communication with each other, directly or indirectly.

In one configuration, the baseband modulator/demodulator 505 may modulate a baseband signal and the in-phase (I) and quadrature (Q) components of the modulated signal (or complex samples based on the modulated signal) may be passed to the DFE module 510. In some embodiments, the baseband modulator/demodulator 505 may be part of the DFE module 510. The DFE module 510 may perform various digital signal processing (DSP) techniques on the complex samples based on the modulated baseband signal. The complex samples may then be converted to an analog signal and passed to the RF module 515. The RF module 515 may filter the analog signal. The power amplifier 355 may amplify the analog signal before the signal is transmitted on one or more wireless channels via the antenna(s) 520.

In some embodiments, the DFE module 510 may include a selection module 525 and a plurality of impairment compensation modules 220-e (e.g., channel-specific impairment compensation modules). Each of the impairment compensation modules 220-e may be configured similarly to one of the impairment compensation modules 220 shown in FIG. 2, 3A, 3B, 3C, 3D, 4A, 4B, 4C and/or 4D. However, different ones of the impairment compensation modules 220-i may be configured for different wireless channels associated with different signal frequencies. For example, each impairment compensation module 220-i may be associated with at least a gain imbalance coefficient and a phase imbalance coefficient of a digital signal to be transmitted at a particular frequency. Each impairment compensation module 220-i may include a scalar module 315 and adder circuit 320 based on the manner in which the I/Q impairments of the signal are modeled (e.g., with respect to the even or odd component of the digital signal). Alternatively, the different impairment compensation modules 220-i may be implemented by the same scalar module 315 and adder circuit 320, as configured with different gain imbalance and phase imbalance coefficients for different channels.

The selection module 525 may be configured to select one of the impairment compensation modules 220-e to compensate for I/Q impairments in a digital signal to be transmitted over a particular wireless channel.

Figure 6:
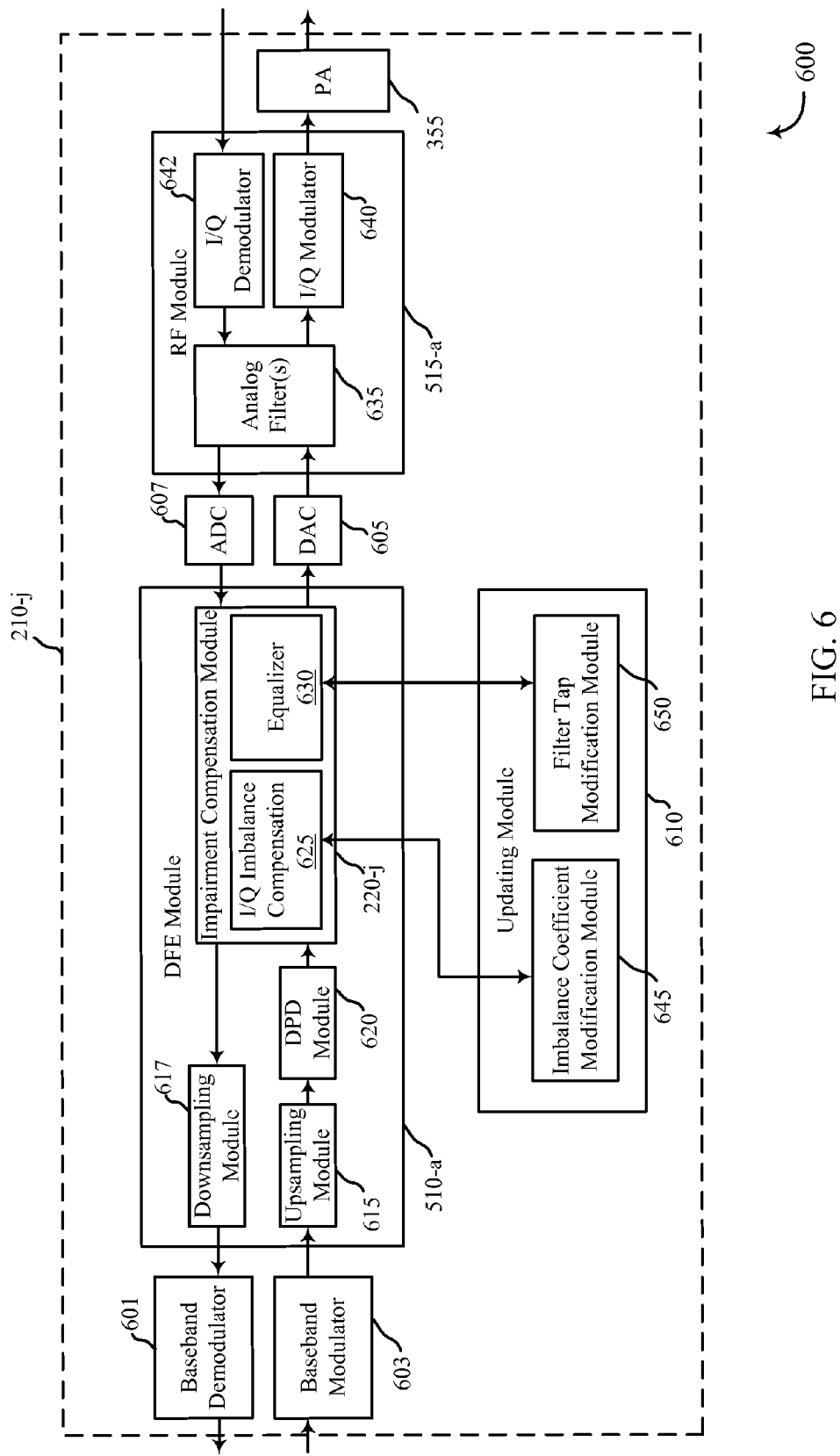
FIG. 6 is a block diagram illustrating another example of a transmit/receive path of a wireless modem in accordance with various embodiments.

FIG. 6 is a block diagram 600 illustrating a further embodiment of the transmit path and receive path of a wireless modem 210-j. The wireless modem 210-j may be an example of one or more of the wireless modems 210 described in FIG. 2, 3A, 3B, 3C, 3D, 4A, 4B, 4C, 4D, and/or 5. In one example, the wireless modem 210-j may include a baseband modulator 603, baseband demodulator 601, a DFE module 510-a, a DAC 605, an ADC 607, an RF module 515-a, a power amplifier 355, and/or an updating module 610. The baseband modulator 603 may be configured to modulate bits to be transmitted onto a baseband frequency, as described with reference to FIG. 5. The baseband demodulator 601 may be configured to demodulate bits from a baseband frequency. The DFE module 510-*a* may include an upsampling module 615, a downsampling module 617, a digital pre-distortion module 620, and/or an impairment compensation module 220-*j*. The RF module 515-*a* may include analog filter(s) 635, an I/Q modulator 640, and an I/Q demodulator 642. The updating module 610 may include an imbalance coefficient modification module 645 and/or a filter tap modification module 650. Each of these components may be in communication with each other, directly or indirectly.

In some configurations, the DFE module 510-*a* may perform various digital signal processing (DSP) techniques on complex samples received from or to be transmitted on a wireless channel. These DSP techniques may include upsampling (e.g., at upsampling module 615), downsampling (e.g., at downsampling module 617), digital pre-distortion (e.g., at digital pre-distortion module 620), and impairment compensation (e.g., at impairment compensation module 220-*j*). The impairment compensations performed at the impairment compensation module 220-*f* may include I/Q imbalance compensation (e.g., at I/Q imbalance compensation module 625) and/or signal equalization (e.g., at equalizer 630).

When bits are transmitted over a wireless channel, the transmit path of the wireless modem 210-*j* may include the baseband modulator 603, the upsampling module 615, the digital pre-distortion module 620, the impairment compensation module 220-*j*, the DAC 605, the analog filters 635, the I/Q modulator 640, and the power amplifier. The baseband modulator 603 may modulate the bits onto a baseband frequency, and complex samples from the baseband modulator 603 may be upsampled to a carrier frequency by the upsampling module 615. The digital pre-distortion module 620 may modify the complex samples to linearize the output of the power amplifier 355. The impairment compensation module 220-*j* may modify the complex samples to pre-compensate for I/Q imbalances that will be introduced into the signal by the analog components of the RF module 515-*a* and the DAC 605, according to the principles described above. The equalizer 630 of the impairment compensation module 220-*j* may filter the complex samples to precompensate for the frequency response of the analog components in the RF module 515-*a* and the DAC 605. The DAC 605 may convert the complex samples output by the impairment compensation module 220-*j* into an analog signal. The analog filters 635 may filter the analog signals, and the I/Q modulator 640 may modulate the analog signals onto the in-phase and quadrature components of a carrier frequency. The power amplifier 355 may amplify the modulated carrier frequency for transmission.

The receive path of the wireless modem 210-*j* may include the I/Q demodulator 642, the analog filters 635, the ADC 607, the impairment compensation module 220-*j*, the downsampling module 617, and the baseband demodulator 601. The I/Q demodulator 642 may demodulate a signal received from one or more antennas into in-phase and quadrature components of a carrier signal. The analog filters 635 may filter the output of the I/Q demodulator 642, and the ADC 607 may convert the analog signal into complex digital samples. The I/Q imbalance compensation module 625 of the impairment compensation module 220-*j* may modify the complex samples to compensate for I/Q imbalances introduced into the signal by the analog components of the RF module 515-*a*, according to the principles described above. The equalizer 630 of the impairment compensation module 220-*j* may filter the complex samples to compensate for the frequency response of the analog components of the RF module 515-*a* and the ADC 607. The downsampling module 617 may downsample the complex samples to a baseband frequency. The baseband demodulator 601 may demodulate the output of the downsampling module 617 to recover the bits of the signal.

As discussed above, the digital pre-distortion module 620, I/Q imbalance compensation module 625, and/or equalizer 630 may compensate for various impairments that may be introduced by analog and RF components (e.g., DAC 605, ADC 607, analog filter(s) 635, I/Q modulator 640, I/Q demodulator 642, power amplifier 355, etc.), also referred to as the analog pipeline of the wireless modem 210-*j*. These impairments may include mismatches between the gain and phase of I/Q components, local oscillator (LO) leakage, gain variations, and non-linear effects. In some embodiments, the impairments may be subject to thermal and temporal variations.

The impairment compensation module 220-*f* may be an example of the impairment compensation module 220 illustrated in FIG. 2, 3A, 3B, 3C, 3D, 4A, 4B, 4C, 4D, and/or 5. The I/Q imbalance compensation module 625 may include one or more of the scalar modules 315 and adder circuits 320 described with reference to previous Figures. The equalizer 630 may include the frequency domain equalizer circuit 325 described with reference to previous Figures.

The imbalance coefficient modification module 645 may be configured to modify one or more of the gain imbalance coefficient and/or the phase imbalance coefficient used by the I/Q imbalance compensation module 625. In certain examples, different pairs of gain and phase imbalance coefficients may be determined or retrieved by the imbalance coefficient modification module 645, depending on the frequency of the digital signal to be transmitted by a particular wireless channel of the wireless modem 210-*j*. The I/Q imbalance compensation module 625 may be updated, as necessary, to use the appropriate gain and phase imbalance coefficients. In some embodiments, the imbalance coefficient modification module 645 may receive at least one measurement of the transmit I/Q impairments associated with a wireless channel, and may determine at least one or both of the gain imbalance coefficient and/or the phase imbalance coefficient for the wireless channel based on the received at least one measurement. In other embodiments, the imbalance coefficient modification module 645 may be programmed with a table of gain and phase imbalance coefficient pairs, wherein each pair is indexed by an associated frequency.

The filter tap modification module 650 may 1) identify at least one parameter affecting transmission of the modulated baseband signal on a wireless channel, and 2) provide a set of filter taps (i.e., equalizer taps) for the equalizer 630. The filter taps may be provided during a power up or initialization sequence of the wireless modem 210-*j*, periodically, or upon the occurrence of some other event (e.g., a calibration procedure or a change in the identified at least one parameter). By way of example, the at least one parameter may be or include at least one parameter of at least one analog low-pass filter associated with the wireless channel (e.g., at least one parameter of at least one of the filters in the analog filter(s) 635). The at least one parameter may include, for example, an in-band amplitude ripple associated with the at least one analog low-pass filter or an in-band phase ripple associated with the at least one analog low-pass filter. The filter tap modification module 650 may configure the equalizer 630 with the new set of filter taps, and the equalizer 630 may equalize the digital signal passing through the wireless modem 210-*j*, in the frequency domain, according to the set of filter taps (and in accord with the at least one parameter).

Figure 7:
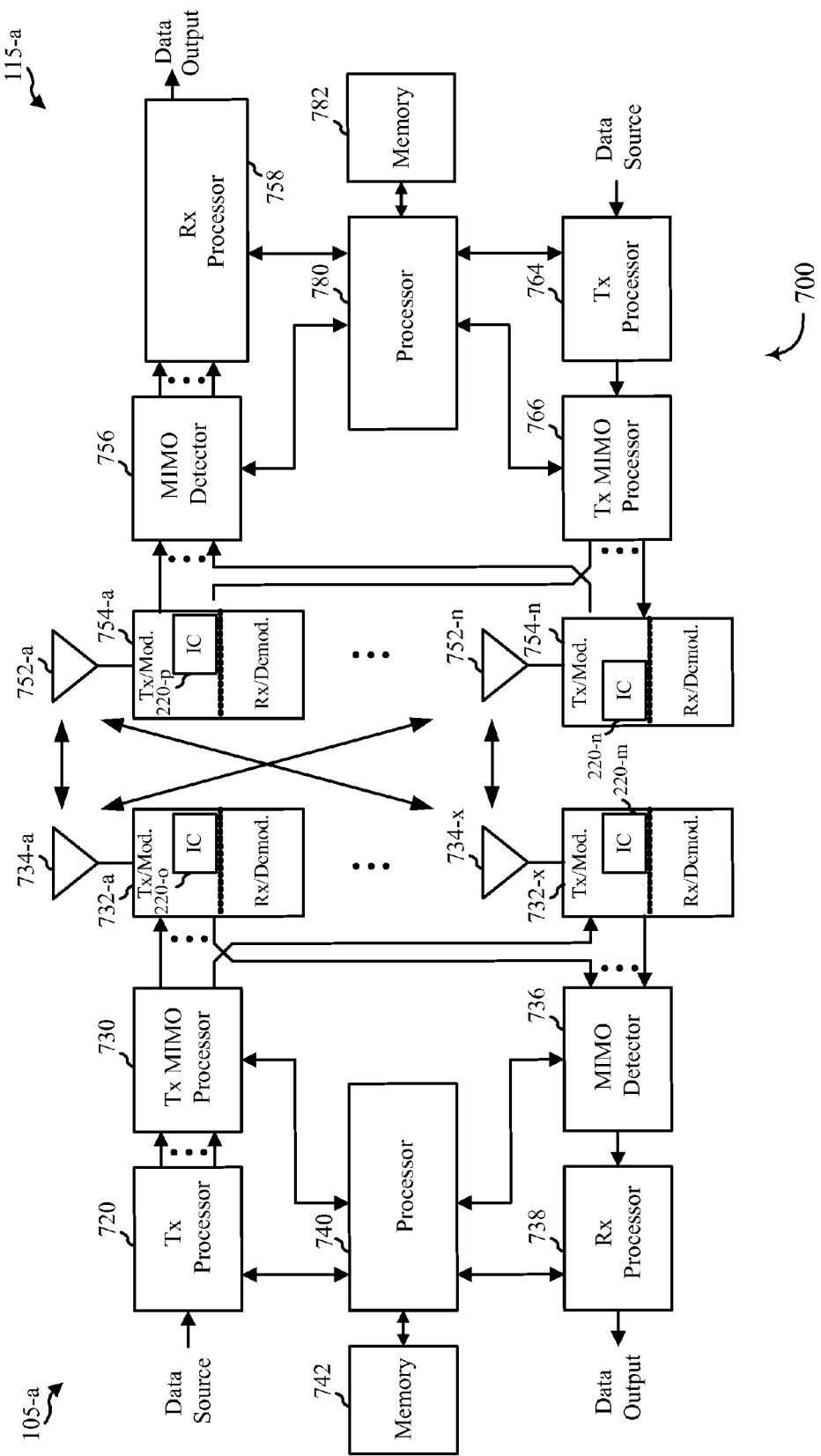
FIG. 7 is a block diagram of a MIMO communication system including a base station and a wireless device.

FIG. 7 is a block diagram of a wireless communication system 700 including a base station 105-a and a wireless device 115-a. This wireless communication system 700 may illustrate aspects of the wireless communication system 100 of FIG. 1. The base station 105-a and/or the wireless device 115-a may be configured as a wireless device 201 in accord with the teachings of FIG. 2. The base station 105-a may be equipped with antennas 734-a through 734-x, and the wireless device 115-a may be equipped with antennas 752-a through 752-n. In the wireless communication system 700, the base station 105-a may be able to send data over multiple wireless channels (or communication links) at the same time. Each wireless channel may be called a "layer" and the "rank" of the wireless channel may indicate the number of layers used for communication. For example, in a 2×2 MIMO system where base station 105-a transmits two "layers," the rank of the communication link between the base station 105-a and the wireless device 115-a is two.

At the base station 105-a, a transmit processor 720 may receive data from a data source. The transmit processor 720 may process the data. The transmit processor 720 may also generate control symbols and/or reference symbols. A transmit (TX) MIMO processor 730 may perform spatial processing (e.g., precoding) on data symbols, control symbols, and/or reference symbols, if applicable, and may provide output symbol streams to the modulator/demodulators 732-a through 732-x. Each modulator/demodulator 732 may process a respective output symbol stream (e.g., for OFDM, etc.) to obtain an output sample stream. The processing of the output symbol streams may include compensating for transmit I/Q impairments in the output symbol streams using, for example, a number of impairment compensation modules 220-o, 220-m. The impairment compensation modules 220-o, 220-m may be examples of any of the impairment compensation modules 220 described with reference to previous Figures. Each modulator/demodulator 732 may further process (e.g., convert to analog, amplify, filter, and upconvert) its respective output sample stream to obtain a downlink (DL) signal. In one example, DL signals from modulator/demodulators 732-a through 732-x may be transmitted via the antennas 734-a through 734-x, respectively.

At the wireless device 115-a, the antennas 752-a through 752-n may receive the DL signals from the base station 105-a and provide the received signals to the modulator/demodulators 754-a through 754-n, respectively. Each modulator/demodulator 754 may condition (e.g., filter, amplify, downconvert, and digitize) a respective received signal to obtain input samples. Each modulator/demodulator 754 may further process the input samples (e.g., for OFDM, etc.) to obtain received symbols. A MIMO detector 756 may obtain received symbols from all the modulator/demodulators 754-a through 754-n, perform MIMO detection on the received symbols if applicable, and provide detected symbols. A receive processor 759 may process (e.g., demodulate, deinterleave, and decode) the detected symbols, providing decoded data for the wireless device 115-a to a data output, and provide decoded control information to a processor 790, or memory 792.

On the uplink (UL), at the wireless device 115-a, a transmit processor 764 may receive and process data from a data source. The transmit processor 764 may also generate control symbols and/or reference symbols. The symbols from the transmit processor 764 may be precoded by a transmit MIMO processor 766 if applicable to generate output symbol streams, be further processed by the modulator/demodulators 754-a through 754-n (e.g., for SC-FDMA, etc.), and be transmitted to the base station 105-a in accordance with the transmission parameters received from the base station 105-a. The processing of the output symbol streams may include compensating for transmit I/Q impairments in the output symbol streams using, for example, a number of impairment compensation modules 220-p, 220-n. The impairment compensation modules 220-m, 220-n may be examples of any of the impairment compensation modules 220 described with reference to previous Figures.

At the base station 105-a, the UL signals from the wireless device 115-a may be received by the antennas 734, processed by the modulator/demodulators 732, detected by a MIMO detector 736 if applicable, and further processed by a receive processor. The receive processor 739 may provide decoded data to a data output and to the processor 740.

In some embodiments, each of the impairment compensation modules 220-m, 220-n, 220-o, and/or 220-p may perform a joint imbalance compensation and MIMO spatial equalization operation on a frequency domain version of one component of a received signal (e.g., the in-phase or quadrature component) by multiplying the frequency domain version of the component by a MIMO spatial equalizer matrix adapted according to the gain imbalance coefficients and phase imbalance coefficients of the plurality of antenna ports.

Consider, without a loss of generality, a 2×2 MIMO case (i.e., two transmitted streams received by two receive antennas). In this embodiment, the receive antenna #0 may output a time domain signal $y_0(n)$ while the receive antenna #1 may output a time domain signal $y_1(n)$, both distorted by a MIMO channel with a frequency response H(f) and separate frequency selective I/Q mismatch functions for gain imbalances $\alpha_0(f)$, $\alpha_1(f)$ and phase imbalances $\beta_0(f)$, $\beta_1(f)$, for receive antennas #0 and #1, respectively. Then, given a MIMO frequency domain spatial equalizer matrix $$W(f) = \begin{bmatrix} w_{00}(f) & w_{01}(f) \\ w_{10}(f) & w_{11}(f) \end{bmatrix}$$

working on I/Q balanced signals, a modified joint I/Q imbalance compensation and spatial equalization matrix may be constructed for impairments modeled with respect to the in-phase component as follows:

$$\tilde{W} = \begin{bmatrix} \frac{1-j\beta_0(f)}{1+\alpha_0(f)}w_{00}(f) & w_{00}(f) & \frac{1-j\beta_1(f)}{1+\alpha_1(f)}w_{01}(f) & w_{01}(f) \\ \frac{1-j\beta_0(k)}{1+\alpha_0(k)}w_{10}(f) & w_{10}(f) & \frac{1-j\beta_1(k)}{1+\alpha_1(k)}w_{11}(f) & w_{11}(f) \end{bmatrix}$$

and a modified joint I/Q imbalance compensation and spatial equalization matrix may be constructed for impairments modeled with respect to the quadrature component as follows:

$$\tilde{W} = \begin{bmatrix} w_{00}(f) & \frac{1+j\beta_0(f)}{1+\alpha_0(f)}w_{00}(f) & w_{01}(f) & \frac{1+j\beta_1(f)}{1+\alpha_1(f)}w_{01}(f) \\ w_{10}(f) & \frac{1+j\beta_0(k)}{1+\alpha_0(k)}w_{10}(f) & w_{11}(f) & \frac{1+j\beta_1(k)}{1+\alpha_1(k)}w_{11}(f) \end{bmatrix}$$

such that a spatially equalized and I/Q balanced signal X(f) may be computed by $$X(f) = \begin{bmatrix} X_0(f) \\ X_1(f) \end{bmatrix} = \tilde{W} \begin{bmatrix} \tilde{X}_{e0}(f) \\ \tilde{X}_{o0}(f) \\ \tilde{X}_{e1}(f) \\ \tilde{X}_{o1}(f) \end{bmatrix}$$

where $\tilde{X}_{e0}(f)$, $\tilde{X}_{o0}(f)$ are the DFT circuit outputs for receive antenna #0, and $\tilde{X}_{e1}(f)$, $\tilde{X}_{o1}(f)$ are the DFT circuit outputs for receive antenna #1.

Thus, as shown above, the impairment compensation process described above with respect to the wireless modems of FIGS. 2, 4A, 4B, 4C, and 4D may be performed separately on the input from separate MIMO antenna ports, using antenna-port specific gain and frequency imbalance coefficients and antenna port-specific MIMO spatial equalization coefficients. The output of each separate impairment compensation process may then be combined to produce a spatially equalized and I/Q balanced frequency domain version of the MIMO signal.

The components of the wireless device 115-a may, individually or collectively, be implemented with one or more Application Specific Integrated Circuits (ASICs) adapted to perform some or all of the applicable functions in hardware. Each of the noted modules may be a means for performing one or more functions related to operation of the wireless communication system 700. Similarly, the components of the base station 105-a may, individually or collectively, be implemented with one or more Application Specific Integrated Circuits (ASICs) adapted to perform some or all of the applicable functions in hardware. Each of the noted components may be a means for performing one or more functions related to operation of the wireless communication system 700.

Figure 8:
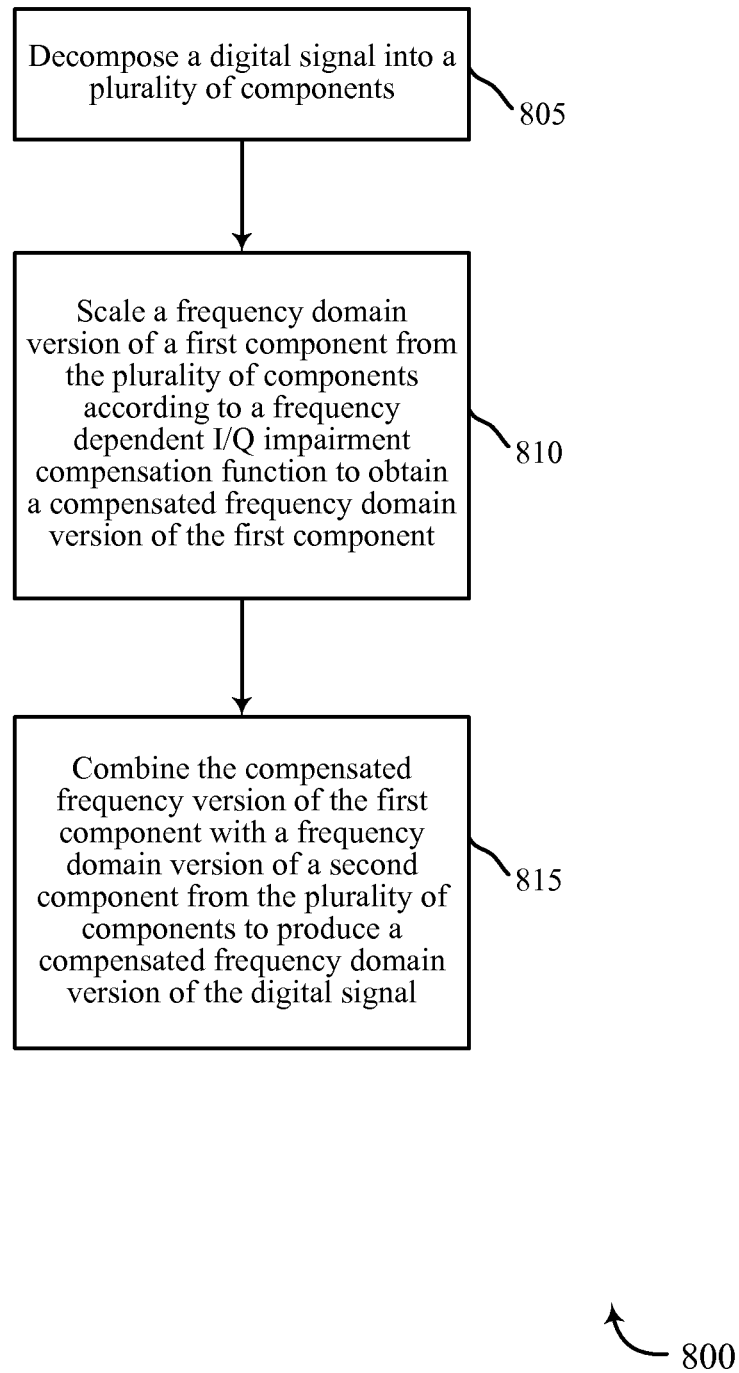
FIG. 8 is a flow chart illustrating an example of a method of compensating for transmit I/Q impairments in a digital signal.

FIG. 8 is a flow chart illustrating an example of a method 800 of compensating for I/Q impairments in a digital signal in accordance with various embodiments. For clarity, the method 800 is described below with reference to one of the wireless modems 210 shown in previous Figures, and/or one of the impairment compensation modules 220 shown in previous Figures. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in previous Figures.

At block 805, a device may decompose a digital signal into a plurality of components. At block 810, the device may scale a frequency domain version of a first component from the plurality of components according to a frequency dependent I/Q impairment compensation function to obtain a compensated frequency domain version of the first component. At block 815, the device may combine the compensated frequency version of the first component with a frequency domain version of a second component from the plurality of components to produce a compensated frequency domain version of the digital signal.

Figure 9:
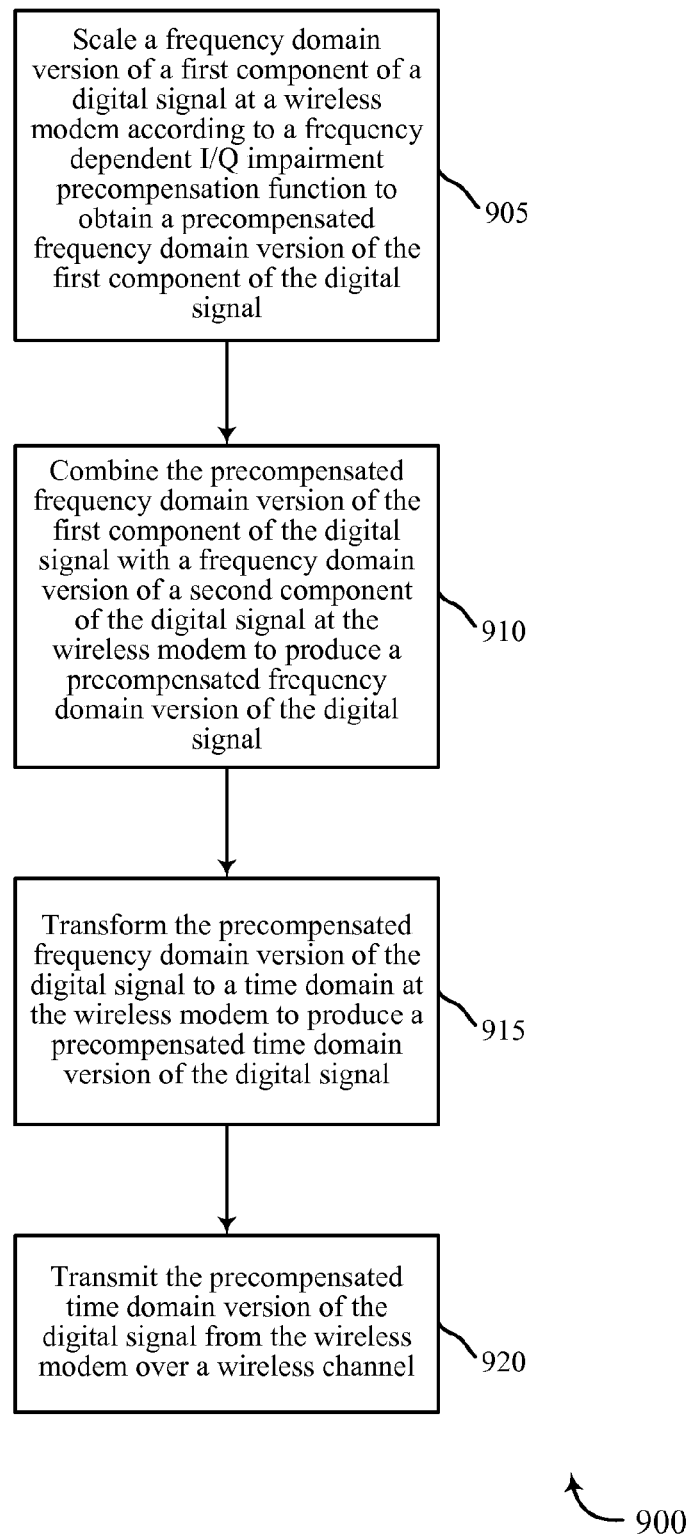
FIG. 9 is a flow chart illustrating an example of a method of compensating for transmit I/Q impairments in a digital signal to be transmitted on a wireless channel.

FIG. 9 is a flow chart illustrating an example of a method 900 of compensating for transmit I/Q impairments in a digital signal having an even component and an odd component. For clarity, the method 900 is described below with reference to one of the wireless modems 210 shown in the previous Figures, and/or one of the impairment compensation modules 220 shown in previous Figures. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in previous Figures. The method may also incorporate aspects of method 800.

At block 905, a frequency domain version of a first one of the components (e.g., the even component or the odd component) of the digital signal may be scaled at a wireless modem 210, according to a frequency dependent I/Q impairment precompensation function, to obtain a precompensated frequency domain version of the first one of the components. The operations at block 905 may in some cases be performed using one of the impairment compensation modules 220 or using one of the scalar modules 315 described with reference to previous Figures.

At block 910, the precompensated frequency domain version of the first one of the components may be combined with a frequency domain version of a second one of the components at the wireless modem 210 to produce a precompensated frequency domain version of the digital signal. The operations at block 910 may in some cases be performed using one of the impairment compensation modules 220 or using one of the adder circuits 320 described with reference to previous Figures.

At block 915, the precompensated frequency domain version of the digital signal may be transformed to a time domain at the wireless modem 210 to produce a precompensated time domain version of the digital signal. The operations at block 915 may in some cases be performed using one of the IDFT circuits 330 described with reference to previous Figures.

At block 920, the precompensated time domain version of the digital signal may be transmitted from the wireless modem 210 over a wireless channel. The operations at block 920 may in some cases be performed using one or more of the wireless modems 210 and/or transmitter modules 215 described with reference to previous Figures.

Thus, the method 900 may compensate for transmit I/Q impairments in a digital signal comprising an even component and an odd component. It should be noted that the method 900 is just one implementation and that the operations of the method 900 may be rearranged or otherwise modified such that other implementations are possible.

Figure 10:
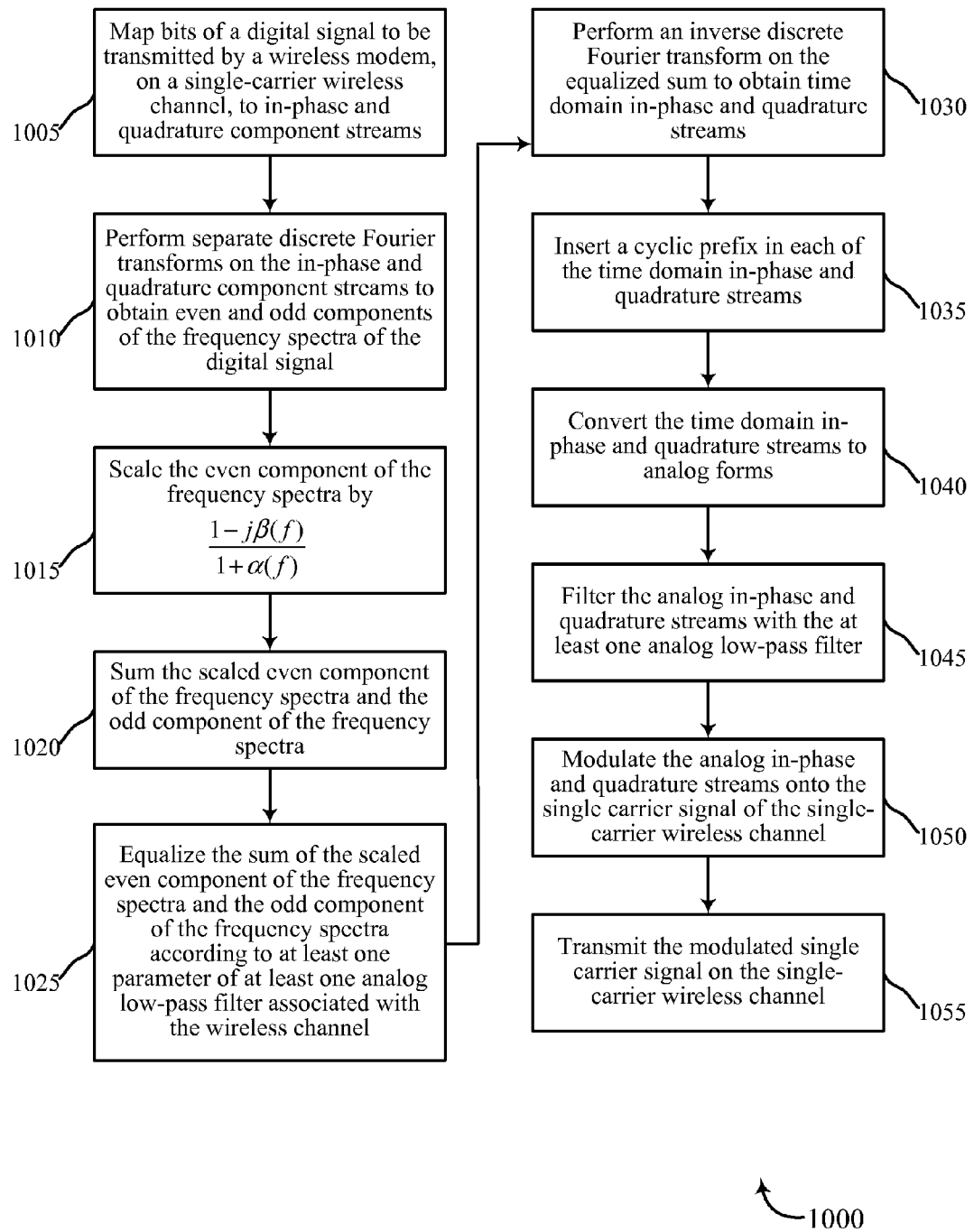
FIG. 10 is a flow chart illustrating an example of a method of compensating for transmit I/Q impairments in a digital signal to be transmitted on a wireless channel.

FIG. 10 is a flow chart illustrating another example of a method 1000 of compensating for transmit I/Q impairments in a digital signal having an even component and an odd component. The method 1000 is one particular implementation of the method 900 described with reference to FIG. 9. For clarity, the method 1000 is described below with reference to one of the wireless modems 210 shown in FIG. 2, 3A, 5, and/or 6, and/or one of the impairment compensation modules 220 shown in FIG. 2, 3A, 5, 6, and/or 7. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in previous Figures. The method may also incorporate aspects of method 800.

At block 1005, bits of a digital signal to be transmitted by a wireless modem 210, on a single-carrier wireless channel (e.g., a wireless channel that employs a single carrier signal), may be mapped to in-phase and quadrature component streams (i.e., in-phase and quadrature components). The operations at block 1005 may in some cases be performed using one of the subcarrier and constellation mapping modules 305 described with reference to previous Figures.

At block 1010, separate discrete Fourier transforms (DFTs) may be performed on the in-phase and quadrature component streams, to obtain even and odd components of the frequency spectra of the digital signal (i.e., even and odd frequency domain versions of the in-phase and quadrature component streams). The operations at block 1010 may in some cases be performed using one or more of the DFT circuits 310 described with reference to previous Figures.

At block 1015, the even component of the frequency spectra of the digital signal may be scaled at the wireless modem 210, according to a frequency dependent I/Q impairment precompensation function, to obtain a pre-compensated even component of the frequency spectra. More particularly, the frequency dependent I/Q impairment precompensation function may scale the even component of the frequency spectra by the frequency-dependent scalar $$\frac{1-j\beta(f)}{1+\alpha(f)}$$

to produce a scaled even component of the frequency spectra, where α includes a gain imbalance coefficient for the digital signal, β includes a phase imbalance coefficient for the digital signal, and f includes the frequency of the even component of the digital signal (or simply the frequency of the digital signal). The operations at block 1015 may in some cases be performed using one or more of the scalar module 315 described with reference to previous Figures.

The gain and phase imbalance coefficients on which the frequency dependent I/Q impairment precompensation function is based may be selected with respect to the frequency of the even component of the frequency spectra (or simply the frequency of the digital signal). The gain and phase imbalance coefficients may also be selected based at least in part on the wireless channel. Selection of the gain imbalance coefficient and the phase imbalance coefficient may in some cases be performed using one or more of the selection modules 525 or imbalance coefficient modification modules 645 described with reference to previous Figures.

The gain and phase imbalance coefficients may in some cases be determined by receiving at least one measurement of the transmit I/Q impairments associated with the single-carrier wireless channel, and then determining at least one or both of the gain imbalance coefficient or the phase imbalance coefficient based on the received at least one measurement. The gain and phase imbalance coefficients may in some cases be determined using the imbalance coefficient modification module 645 described with reference to FIG. 6.

At block 1020, the scaled even component of the frequency spectra may be summed with the odd component of the frequency spectra to produce a precompensated frequency domain version of the digital signal. The operations at block 1020 may in some cases be performed using one or more of the adder circuits 320 described with reference to previous Figures.

At block 1025, the sum of the scaled even component of the frequency spectra and the odd component of the frequency spectra may be equalized in the frequency domain according to at least one parameter of at least one analog low-pass filter associated with the wireless channel. By way of example, the at least one parameter of the at least one analog low-pass filter may include an in-band amplitude ripple associated with the at least one analog low-pass filter or an in-band phase ripple associated with the at least one analog low-pass filter. The operations at block 1025 may in some cases be performed using one or more of the frequency domain equalizer circuits 325 described with reference to previous Figures.

At block 1030, the equalized precompensated frequency domain version of the digital signal may be transformed to a time domain at the wireless modem 210, to produce a pre-compensated time domain version of the digital signal. More particularly, an inverse discrete Fourier transform (IDFT) may be performed on the equalized sum of the scaled even component of the frequency spectra and the odd component of the frequency spectra, to obtain time domain in-phase and quadrature streams. The operations at block 1030 may in some cases be performed using one or more of the IDFT circuits 330 described with reference to previous Figures.

At block 1035, a cyclic prefix may be inserted in each of the time domain in-phase and quadrature streams. The operations at block 1035 may in some cases be performed using one or more of the CP insertion modules 335 described with reference to previous Figures.

At block 1040, the time domain in-phase and quadrature streams may be converted to analog forms. The operations at block 1040 may in some cases be performed using one or more of the DAC/ADC modules 340, or DAC 605 described with reference to the previous Figures.

The analog forms of the in-phase and quadrature streams may be filtered using at least one low-pass filter for the channel at block 1045. The operations at block 1045 may in some cases be performed using one or more of the analog filters 345, the RF modules 515, or the analog filters 635 described with reference to previous Figures.

At block 1050, the filtered analog in-phase and quadrature streams may be modulated onto the single carrier signal of the single-carrier wireless channel. The operations at block 1050 may in some cases be performed using one or more of the I/Q modulator/demodulators 350 or the I/Q modulator 640 described with reference to previous Figures.

At block 1055, the modulated single carrier signal may be transmitted on the single-carrier wireless channel. The transmitting may in some cases be performed using the wireless modem 210 and/or one of the transmitter modules 215 described with reference to previous Figures.

Thus, the method 1000 may compensate for transmit I/Q impairments in a digital signal comprising an even component and an odd component. It should be noted that the method 1000 is just one implementation and that the operations of the method 1000 may be rearranged or otherwise modified such that other implementations are possible.

In an alternate embodiment of the method 1000, the method 1000 may be modified such that, at block 1015, the odd component of the frequency spectra of the digital signal (rather than the even component of the frequency spectra) may be scaled at the wireless modem 210, according to a frequency dependent I/Q impairment precompensation function, to obtain a pre-compensated odd component of the frequency spectra. More particularly, the frequency dependent I/Q impairment precompensation function may scale the odd component of the frequency spectra by the frequency-dependent scalar $$\frac{1+j\beta(f)}{1+\alpha(f)}$$

to produce a scaled odd component of the frequency spectra, where a includes a gain imbalance coefficient for the digital signal, β includes a phase imbalance coefficient for the digital signal, and f includes the frequency of the odd component of the digital signal (or simply the frequency of the digital signal). The gain and phase imbalance coefficients used in the modified block 1015 will typically differ from the gain and phase imbalance coefficients used in the block 1015 shown in FIG. 10. The operations at modified block 1015 may in some cases be performed using one or more of the scalar modules 315 described with reference to previous Figures.

At a modified block 1020, the scaled odd component of the frequency spectra may be summed with the even component of the frequency spectra to produce a precompensated frequency domain version of the digital signal. The operations at modified block 1020 may in some cases be performed using one or more of the adder circuits 320 described with reference to previous Figures.

Other operations of the alternate embodiment of method 1000 may be performed similarly to the operations performed at blocks 1005, 1010, 1025, 1030, 1035, 1040, 1045, 1050, and 1055 of method 1000.

Figure 11:
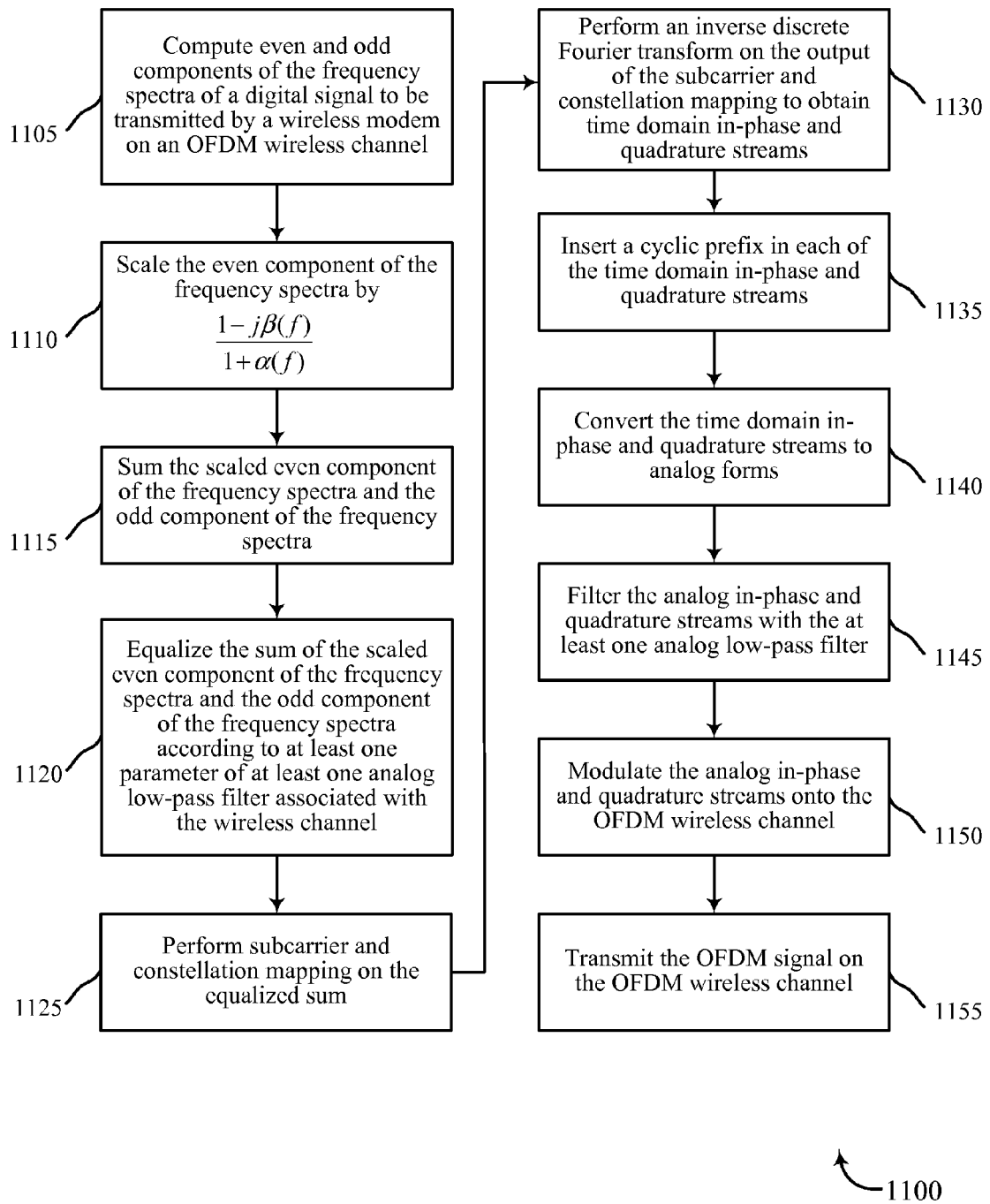
FIG. 11 is a flow chart illustrating an example of a method of compensating for transmit I/Q impairments in a digital signal to be transmitted on a wireless channel.

FIG. 11 is a flow chart illustrating yet another example of a method 1100 of compensating for transmit I/Q impairments in a digital signal having an even component and an odd component. The method 1100 is another particular implementation of the method 900 described with reference to FIG. 9. For clarity, the method 1100 is described below with reference to one of the wireless modems 210 shown in FIG. 2, 3C, 3D, 5, and/or 6, and/or one of the impairment compensation modules 220 shown in FIG. 2, 3C, 3D, 5, 6, and/or 7. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in FIG. 1 and/or 7. The method may also incorporate aspects of method 800.

At block 1105, even and odd components of the frequency spectra of a digital signal to be transmitted on an OFDM wireless channel (i.e., an OFDM signal) are computed. The even component of the OFDM signal may be computed as $$X_e(f) = \frac{1}{2}[X(f) + X^*(-f)]$$

where $X_e(f)$ includes the even component of the OFDM signal, $X(f)$ includes the OFDM signal, and f includes the frequency of the even component of the OFDM signal (or simply the frequency of the OFDM signal). The odd component of the OFDM signal may be computed as $$X_o(f) = \frac{1}{2}[X(f) - X^*(-f)]$$

where $X_o(f)$ includes the odd component of the OFDM signal, $X(f)$ includes the OFDM signal, and f includes the frequency of the odd component of the OFDM signal (or simply the frequency of the OFDM signal). The operations at block 1105 may in some cases be performed using one or more of the even/odd computation modules 360 described with reference to previous Figures.

At block 1110, the even component of the frequency spectra of the OFDM signal may be scaled at the wireless modem 210, according to a frequency dependent I/Q impairment precompensation function, to obtain a pre-compensated even component of the frequency spectra. More particularly, the frequency dependent I/Q impairment precompensation function may scale the even component of the frequency spectra by the frequency-dependent scalar $$\frac{1 - j\beta(f)}{1 + \alpha(f)}$$

to produce a scaled even component of the frequency spectra, where α includes a gain imbalance coefficient for the digital signal, β includes a phase imbalance coefficient for the digital signal, and f includes the frequency of the even component of the OFDM signal (or simply the frequency of the OFDM signal). The operations at block 1110 may in some cases be performed using one or more of the scalar modules 315 described above with reference to previous Figures.

The gain and phase imbalance coefficients on which the frequency dependent I/Q impairment precompensation function is based may be selected with respect to the frequency of the even component of the frequency spectra (or simply the frequency of the OFDM signal). The gain and phase imbalance coefficients may also be selected based at least in part on the wireless channel. Selection of the gain imbalance coefficient and the phase imbalance coefficient may in some cases be performed using one or more of the selection modules or the imbalance coefficient modification modules 645 described with reference to previous Figures.

The gain and phase imbalance coefficients may in some cases be determined by receiving at least one measurement of the transmit I/Q impairments associated with the OFDM wireless channel, and then determining at least one or both of the gain imbalance coefficient or the phase imbalance coefficient based on the received at least one measurement. The gain and phase imbalance coefficients may in some cases be determined using one or more of the imbalance coefficient modification modules 645 described with reference to previous Figures.

At block 1115, the scaled even component of the frequency spectra may be summed with the odd component of the frequency spectra to produce a precompensated frequency domain version of the digital signal. The operations at block 1115 may in some cases be performed using one or more of the adder circuits 320 described with reference to previous Figures.

At block 1120, the sum of the scaled even component of the frequency spectra and the odd component of the frequency spectra may be equalized in the frequency domain according to at least one parameter of at least one analog low-pass filter associated with the wireless channel. By way of example, the at least one parameter of the at least one analog low-pass filter may include an in-band amplitude ripple associated with the at least one analog low-pass filter or an in-band phase ripple associated with the at least one analog low-pass filter. The operations at block 1120 may in some cases be performed using one of the frequency domain equalizer circuits 325 or equalizers 630 described with reference to previous Figures.

At block 1125, subcarrier and subcarrier and constellation mapping may be performed on the equalized sum. The operations at block 1125 may in some cases be performed by one or more of the tone and subcarrier and constellation mapping modules 305 described with reference to previous Figures.

At block 1130, the output of the subcarrier and subcarrier and constellation mapping may be transformed to a time domain at the wireless modem 210, to produce a precompensated time domain version of the digital signal. More particularly, an inverse discrete Fourier transform (IDFT) may be performed on the output of the subcarrier and subcarrier and constellation mapping, to obtain time domain in-phase and quadrature streams. The operations at block 1130 may in some cases be performed using one or more of the IDFT circuits 330 described with reference to previous Figures.

At block 1135, a cyclic prefix may be inserted in each of the time domain in-phase and quadrature streams. The operations at block 1135 may in some cases be performed using one or more of the CP insertion modules 335 described with reference to previous Figures.

At block 1140, the time domain in-phase and quadrature streams may be converted to analog forms. The operations at block 1140 may in some cases be performed using one or more of the DAC/ADC modules or DAC 605 described with reference to previous Figures.

The analog forms of the in-phase and quadrature streams may be filtered using at least one low-pass filter for the channel at block 1145. The operations at block 1145 may in some cases be performed using one or more of the analog filter(s) 345, RF modules 515, or the analog filter(s) 635 described with reference to previous Figures.

At block 1150, the filtered analog in-phase and quadrature streams may be modulated onto the OFDM wireless channel. The operations at block 1150 may in some cases be performed using one of the I/Q modulator/demodulators 350 or I/Q modulators 640 described with reference to previous Figures.

At block 1155, the OFDM signal may be transmitted on the OFDM wireless channel. The transmitting may in some cases be performed using the wireless modem 210 and/or one of the transmitter modules 215, described with reference to previous Figures.

Thus, the method 1100 may compensate for transmit I/Q impairments in a digital signal comprising an even component and an odd component. It should be noted that the method 1100 is just one implementation and that the operations of the method 1100 may be rearranged or otherwise modified such that other implementations are possible.

In an alternate embodiment of the method 1100, the method 1100 may be modified such that, at block 1110, the odd component of the frequency spectra of the OFDM signal (rather than the even component of the frequency spectra) may be scaled at the wireless modem 210, according to a frequency dependent I/Q impairment precompensation function, to obtain a pre-compensated odd component of the frequency spectra. More particularly, the frequency dependent I/Q impairment precompensation function may scale the odd component of the frequency spectra by the frequency-dependent scalar $$\frac{1+j\beta(f)}{1+\alpha(f)}$$

to produce a scaled odd component of the frequency spectra, where α includes a gain imbalance coefficient for the OFDM signal, β includes a phase imbalance coefficient for the OFDM signal, and f includes the frequency of the odd component of the OFDM signal (or simply the frequency of the OFDM signal). The gain and phase imbalance coefficients used in the modified block 1110 will typically differ from the gain and phase imbalance coefficients used in the block 1110 shown in FIG. 10. The operations at modified block 1110 may in some cases be performed using one or more of the scalar modules 315 described with reference to previous Figures.

At a modified block 1115, the scaled odd component of the frequency spectra may be summed with the even component of the frequency spectra to produce a precompensated frequency domain version of the OFDM signal. The operations at modified block 1115 may in some cases be performed using one or more of the adder circuits 320 described with reference to previous Figures.

Other operations of the alternate embodiment of method 1100 may be performed similarly to the operations performed at blocks 1105, 1120, 1125, 1130, 1135, 1140, 1145, 1150, and 1155 of method 1100.

Figure 12:
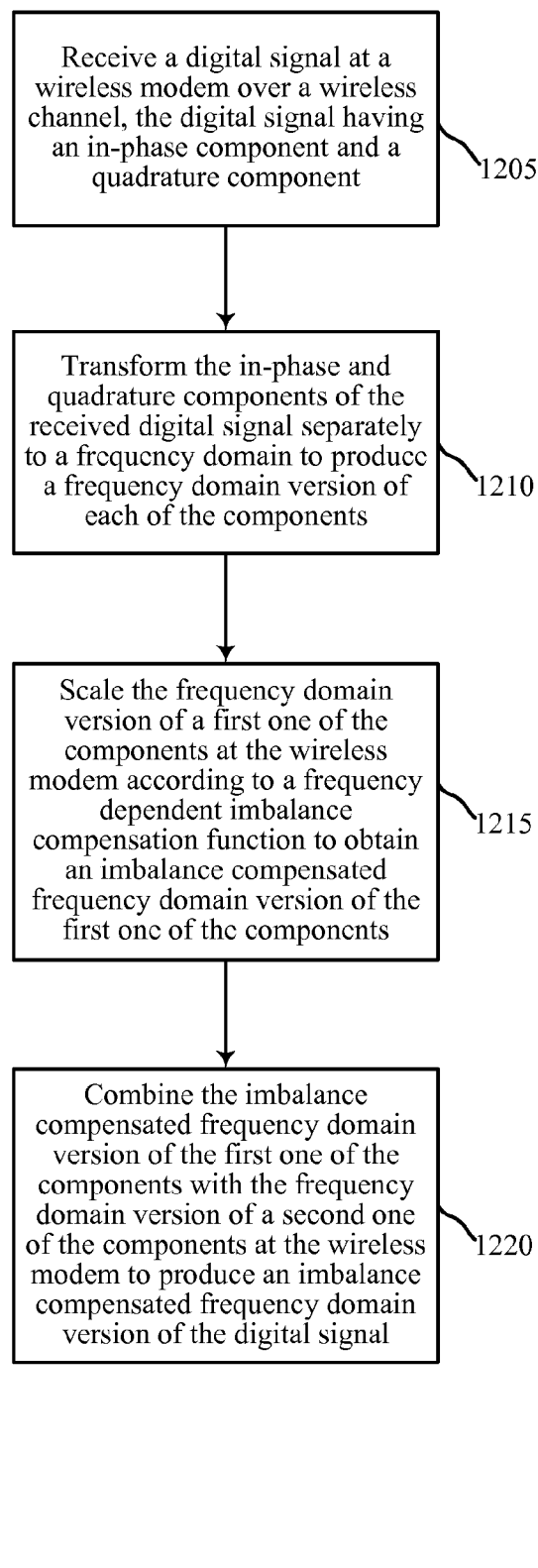
FIG. 12 is a flow chart illustrating an example of a method of compensating for transmit I/Q impairments in a digital signal received on a wireless channel.

FIG. 12 is a flow chart illustrating an example of a method 1200 of compensating for I/Q imbalances in a digital signal. For clarity, the method 1200 is described below with reference to one of the wireless modems 210 shown in FIG. 2, 4A, 4B, 4C, 4D, 5, and/or 6, and/or one of the impairment compensation modules 220 shown in FIG. 2, 4A, 4B, 4C, 4D, 5, 6, and/or 7. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in FIG. 1 and/or 7. The method may also incorporate aspects of method 800.

At block 1205, a digital signal may be received over a wireless channel at a wireless modem 210. The digital signal may include an in-phase component and a quadrature component. The operations at block 1205 may in some cases be performed using one or more of the wireless modems 210 and/or one or more of the receiver modules 205 described with reference to previous Figures.

At block 1210, the in-phase and quadrature components of the received digital signal may be separately transformed to a frequency domain to produce a frequency domain version of each of the components. The operations at block 1210 may in some cases be performed using one of the DFT circuits 310 described with reference to previous Figures.

At block 1215, the frequency domain version of a first one of the components may be scaled at the wireless modem according to a frequency dependent imbalance compensation function to obtain an imbalance compensated frequency domain version of the first one of the components. The operations at block 1215 may in some cases be performed using one or more of the scalar modules 315 described with reference to previous Figures.

At block 1220, the imbalance compensated frequency domain version of the first one of the components may be combined with the frequency domain version of a second one of the components, at the wireless modem, to produce an imbalance compensated frequency domain version of the digital signal. The operations at block 1220 may in some cases be performed using one of the adder circuits 320 described with reference to previous Figures.

Thus, the method 1200 may compensate for receive I/Q imbalances in a digital signal. It should be noted that the method 1200 is just one implementation and that the operations of the method 1200 may be rearranged or otherwise modified such that other implementations are possible.

Figure 13:
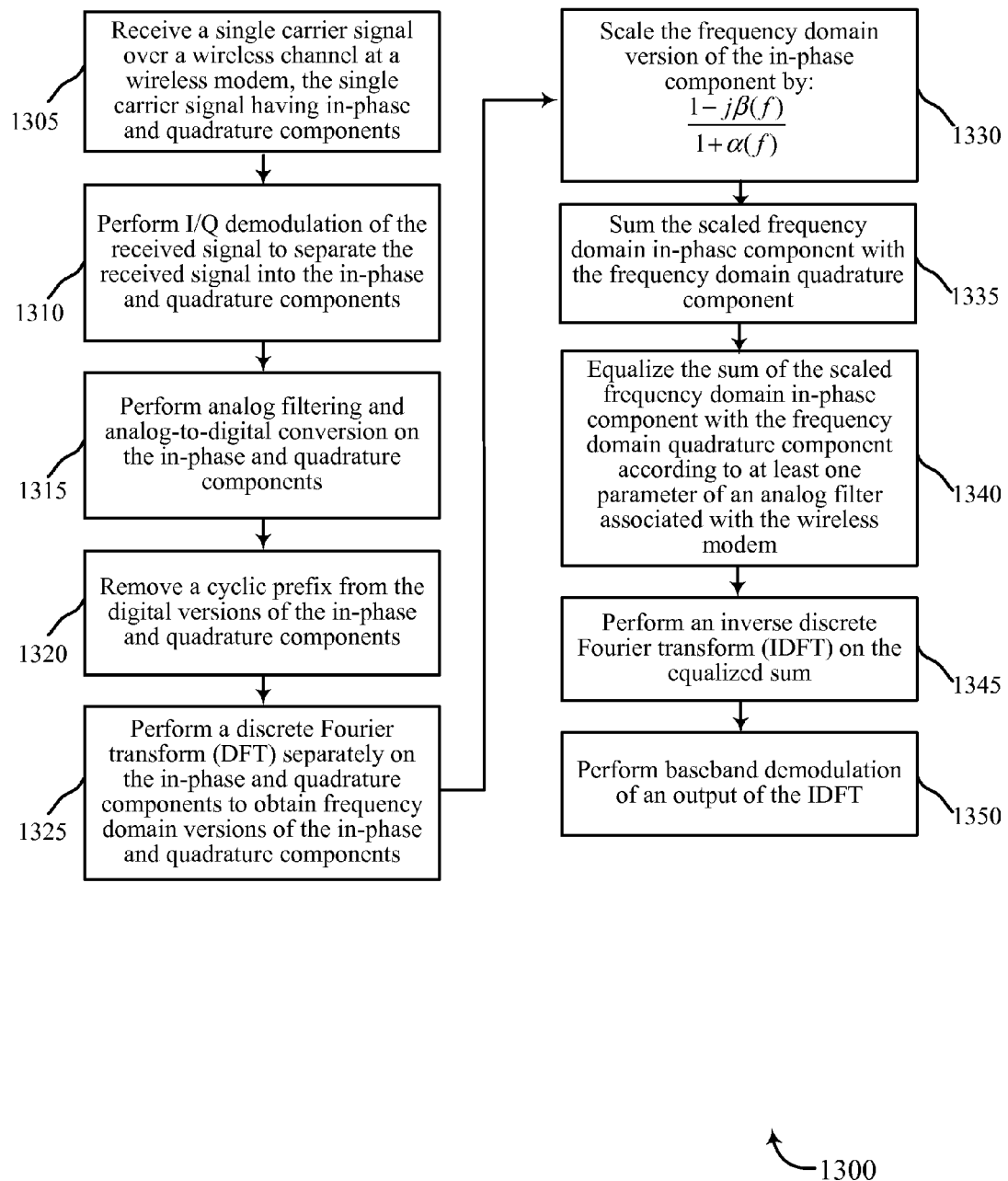
FIG. 13 is a flow chart illustrating another example of a method of compensating for transmit I/Q impairments in a digital signal received on a wireless channel.

FIG. 13 is a flow chart illustrating another example of a method 1300 of compensating for I/Q imbalances in a digital signal. The method 1300 is one particular implementation of the method 1200 described with reference to FIG. 12. For clarity, the method 1300 is described below with reference to one of the wireless modems 210 shown in FIG. 2, 4A, 5, and/or 6, and/or one of the impairment compensation modules 220 shown in FIG. 2, 4A, 5, 6, and/or 7. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in FIG. 1 and/or 7. The method may also incorporate aspects of method 800.

At block 1305, a single carrier signal may be received over a wireless channel at a wireless modem 210. The single carrier signal (a digital signal) may include in-phase and quadrature components. The operations at block 1305 may in some cases be performed using one or more of the receiver modules 205 described with reference to previous Figures.

At block 1310, the single carrier signal may be demodulated to separate the received signal into its in-phase and quadrature components. The operations at block 1310 may in some cases be performed using one or more of the I/Q modulator/demodulators 350 or I/Q demodulator 642 described with reference to previous Figures.

The analog forms of the in-phase and quadrature components may be filtered using at least one analog filter (e.g., a low-pass filter), and then converted to digital versions, at block 1315. The filtering operations performed at block 1315 may in some cases be performed using the analog filter(s) 345, the RF module 515, or the analog filter(s) 615 described with reference to previous Figures. The analog-to-digital conversion operations performed at block 1315 may in some cases be performed using the DAC/ADC module 340 or DAC 605 described with reference to previous Figures.

At block 1320, a cyclic prefix may be removed from each of the in-phase and quadrature components (i.e., from the digital versions of the in-phase and quadrature components). The operations at block 1320 may in some cases be performed using the CP removal module 410 described with reference to FIG. 4A.

At block 1325, separate discrete Fourier transforms (DFTs) may be performed on the digital versions of the in-phase and quadrature components, to obtain frequency domain versions of the in-phase and quadrature components. The operations at block 1325 may in some cases be performed using the DFT circuits 310 described with reference to FIG. 4A.

At block 1330, the frequency domain version of the in-phase component of the single carrier signal may be scaled at the wireless modem 210 according to a frequency dependent imbalance compensation function to obtain an imbalance compensated frequency domain version of the in-phase component. More particularly, the frequency dependent imbalance compensation function may scale the in-phase frequency domain version of the in-phase component of the single carrier signal by the frequency-dependent scalar $$\frac{1 - j\beta(f)}{1 + \alpha(f)}$$

to produce the imbalance compensated frequency domain version of the in-phase component, where α includes a gain imbalance coefficient for the single carrier signal, β includes a phase imbalance coefficient for the single carrier signal, and f includes the frequency of the in-phase component of the single carrier signal (or simply the frequency of the single carrier signal). The operations at block 1330 may in some cases be performed using the scalar module 315 described with reference to FIG. 4A.

The gain and phase imbalance coefficients on which the frequency dependent imbalance compensation function is based may be selected with respect to the frequency of the in-phase component of the single carrier signal (or simply the frequency of the single carrier signal). The gain and phase imbalance coefficients may also be selected based at least in part on the wireless channel. Selection of the gain imbalance coefficient and the phase imbalance coefficient may in some cases be performed using the selection module 525 described with reference to FIG. 5 or the imbalance coefficient modification module 645 described with reference to FIG. 6.

The gain and phase imbalance coefficients may in some cases be determined by receiving at least one measurement of receiver I/Q imbalance associated with the wireless channel, and then determining at least one or both of the gain imbalance coefficient and the phase imbalance coefficient as a function of frequency based on the received at least one measurement. The frequency-dependent scalar may then be determined from the gain imbalance coefficient and the phase imbalance coefficient. The gain and phase imbalance coefficients may in some cases be determined using the imbalance coefficient modification module 645 described with reference to FIG. 6.

At block 1335, the imbalance compensated frequency domain version of the in-phase component of the single carrier signal may be summed with the frequency domain version of the quadrature component of the single carrier signal to produce an imbalance compensated frequency domain version of the single carrier signal. The operations at block 1335 may in some cases be performed using one or more of the adder circuit 320 described with reference to previous Figures.

At block 1340, the sum of the imbalance compensated frequency domain version of the in-phase component of the single carrier signal and the frequency domain version of the quadrature component of the single carrier signal (i.e., the imbalance compensated frequency domain version of the single carrier signal) may, optionally, be equalized in the frequency domain according to at least one parameter of at least one analog filter associated with the wireless channel (e.g., an analog low-pass filter associated with the wireless channel). By way of example, the at least one parameter of the at least one analog filter may include an in-band amplitude ripple associated with the at least one analog filter or an in-band phase ripple associated with the at least one analog filter. The operations at block 1340 may in some cases be performed using one or more of the frequency domain equalizer circuits 325 or equalizers 630 described with reference to previous Figures.

At block 1345, the equalized imbalance compensated frequency domain version of the single carrier signal (e.g., the equalized sum) may be transformed to a time domain at the wireless modem 210, to produce an imbalance compensated time domain version of the digital signal. More particularly, an inverse discrete Fourier transform (IDFT) may be performed on the equalized imbalance compensated frequency domain version of the single carrier signal, to obtain time domain in-phase and quadrature streams. The operations at block 1345 may in some cases be performed using one or more of the IDFT circuits 330 described with reference the previous Figures.

At block 1350, baseband demodulation may be performed on the output of the IDFT. The operations at block 1350 may in some cases be performed using the baseband demodulator circuit 365 described with reference to FIG. 4C, 5, and/or 6.

Thus, the method 1300 may compensate for receive I/Q imbalances in a single carrier signal. It should be noted that the method 1300 is just one implementation and that the operations of the method 1300 may be rearranged or otherwise modified such that other implementations are possible.

In an alternate embodiment of the method 1300, the method 1300 may be modified such that, at block 1330, the frequency domain version of the quadrature component of the single carrier signal (rather than the frequency domain version of the in-phase component of the single carrier signal) may be scaled at the wireless modem 210, according to a frequency dependent I/Q imbalance compensation function, to obtain an imbalance compensated frequency domain version of the quadrature component of the single carrier signal. More particularly, the frequency dependent I/Q imbalance compensation function may scale the frequency domain version of the quadrature component of the single carrier signal by the frequency-dependent scalar $$\frac{1+j\beta(f)}{1+\alpha(f)}$$

to produce the imbalance compensated frequency domain version of the quadrature component, where α includes a gain imbalance coefficient for the single carrier signal, β includes a phase imbalance coefficient for the single carrier signal, and f includes the frequency of the quadrature component of the single carrier signal (or simply the frequency of the single carrier signal). The gain and phase imbalance coefficients used in the modified block 1330 will typically differ from the gain and phase imbalance coefficients used in the block 1330 shown in FIG. 13. The operations at modified block 1330 may in some cases be performed using the scalar module 315 described with reference to FIG. 4B.

At a modified block 1335, the imbalance compensated frequency domain version of the quadrature component of the single carrier signal may be summed with the frequency domain version of the in-phase component of the single carrier signal to produce an imbalance compensated frequency domain version of the single carrier signal. The operations at the modified block 1335 may in some cases be performed using the adder circuit 320 described with reference to FIG. 4B.

Other operations of the alternate embodiment of method 1300 may be performed similarly to the operations performed at blocks 1305, 1310, 1315, 1320, 1325, 1340, 1345, and 1350 of method 1300.

Figure 14:
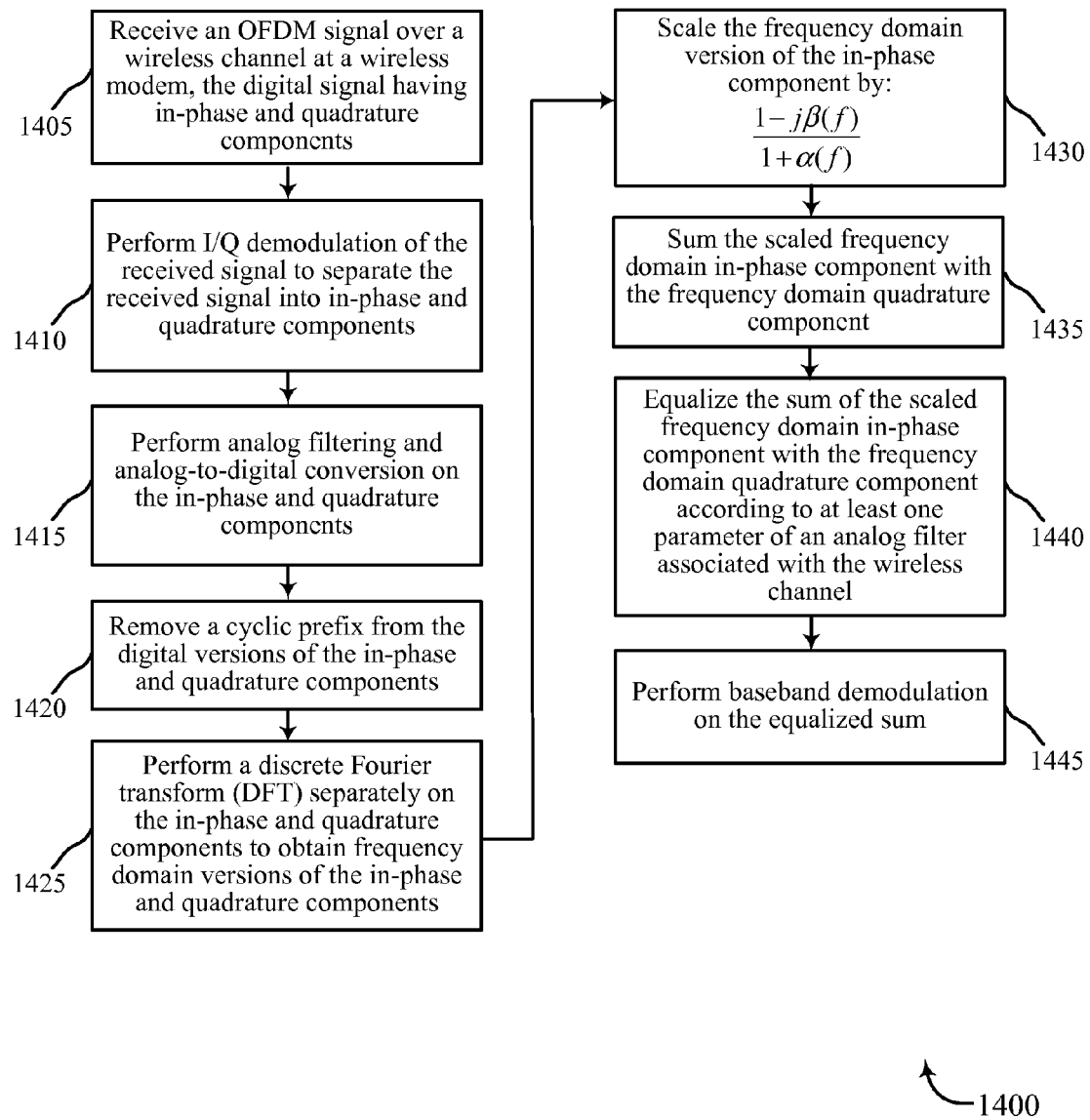
FIG. 14 is a flow chart illustrating yet another example of a method of compensating for transmit I/Q impairments in a digital signal received on a wireless channel.

FIG. 14 is a flow chart illustrating another example of a method 1400 of compensating for I/Q imbalances in a digital signal. The method 1400 is one particular implementation of the method 1200 described with reference to FIG. 12. For clarity, the method 1400 is described below with reference to one of the wireless modems 210 shown in FIG. 2, 4C, 5, and/or 6, and/or one of the impairment compensation modules 220 shown in FIG. 2, 4C, 5, 6, and/or 7. In some implementations, a wireless modem 210 may execute one or more sets of codes to control the functional elements of a wireless device, such as the wireless device 201 described with reference to FIG. 2, to perform the functions described below. The wireless device may in some cases be one of the base stations 105 or wireless devices 115 shown in FIG. 1 and/or 7. The method may also incorporate aspects of method 800.

At block 1405, an OFDM signal (a digital signal) may be received over a wireless channel at a wireless modem 210. The OFDM signal may include in-phase and quadrature components. The operations at block 1405 may in some cases be performed by the receiver module 205 described with reference to FIG. 2.

At block 1410, the OFDM signal may be demodulated to separate the received signal into its in-phase and quadrature components. The operations at block 1410 may in some cases be performed using one or more of the I/Q modulator/demodulators 350 or the I/Q demodulator 642 described with reference to previous Figures.

The analog forms of the in-phase and quadrature components may be filtered using at least one analog filter (e.g., a low-pass filter), and then converted to digital versions, at block 1415. The filtering operations performed at block 1415 may in some cases be performed using the analog filter(s) 315 described with reference to previous Figures. The analog-to-digital conversion operations performed at block 1415 may in some cases be performed using one or more of the DAC/ADC modules 340 or ADC 607 described with reference to previous Figures.

At block 1420, a cyclic prefix may be removed from each of the in-phase and quadrature components (i.e., from the digital versions of the in-phase and quadrature components). The operations at block 1420 may in some cases be performed using one or more of the CP removal modules 410 described with reference to previous Figures.

At block 1425, separate discrete Fourier transforms (DFTs) may be performed on the digital versions of the in-phase and quadrature components, to obtain frequency domain versions of the in-phase and quadrature components. The operations at block 1425 may in some cases be performed using one or more of the DFT circuits 310 described with reference to previous Figures.

At block 1430, the frequency domain version of the in-phase component of the OFDM signal may be scaled at the wireless modem 210 according to a frequency dependent imbalance compensation function to obtain an imbalance compensated frequency domain version of the in-phase component. More particularly, the frequency dependent imbalance compensation function may scale the frequency domain version of the in-phase component of the OFDM signal by the frequency-dependent scalar $$\frac{1-j\beta(f)}{1+\alpha(f)}$$

to produce the imbalance compensated frequency domain version of the in-phase component, where α includes a gain imbalance coefficient for the OFDM signal, β includes a phase imbalance coefficient for the OFDM signal, and f includes the frequency of the in-phase component of the OFDM signal. The operations at block 1430 may in some cases be performed using one or more of the scalar modules 315 described with reference to previous Figures.

The gain and phase imbalance coefficients on which the frequency dependent imbalance compensation function is based may be selected with respect to the frequency of the in-phase component of the OFDM signal (or simply the frequency of the OFDM signal). The gain and phase imbalance coefficients may also be selected based at least in part on the wireless channel. Selection of the gain imbalance coefficient and the phase imbalance coefficient may in some cases be performed using the selection module 525 described with reference to FIG. 5 or the imbalance coefficient modification module 645 described with reference to FIG. 6.

The gain and phase imbalance coefficients may in some cases be determined by receiving at least one measurement of receiver I/Q imbalance associated with the wireless channel, and then determining at least one or both of the gain imbalance coefficient and the phase imbalance coefficient as a function of frequency based on the received at least one measurement. The frequency-dependent scalar may then be determined from the gain imbalance coefficient and the phase imbalance coefficient. The gain and phase imbalance coefficients may in some cases be determined using the imbalance coefficient modification module 645 described with reference to FIG. 6.

At block 1435, the imbalance compensated frequency domain version of the in-phase component of the OFDM signal may be summed with the frequency domain version of the quadrature component of the OFDM signal to produce an imbalance compensated frequency domain version of the OFDM signal. The operations at block 1435 may in some cases be performed using one or more of the adder circuits 320 described with reference to previous Figures.

At block 1440, the sum of the imbalance compensated frequency domain version of the in-phase component of the OFDM signal and the frequency domain version of the quadrature component of the OFDM signal (i.e., the imbalance compensated frequency domain version of the OFDM signal) may, optionally, be equalized in the frequency domain according to at least one parameter of at least one analog filter associated with the wireless channel (e.g., an analog low-pass filter associated with the wireless channel). By way of example, the at least one parameter of the at least one analog filter may include an in-band amplitude ripple associated with the at least one analog filter or an in-band phase ripple associated with the at least one analog filter. The operations at block 1440 may in some cases be performed using one or more of the frequency domain equalizer circuits 325 or equalizers 630 described with reference to previous Figures.

At block 1445, baseband demodulation may be performed on the equalized imbalance compensated frequency domain version of the OFDM signal (e.g., the equalized sum). The operations at block 1445 may in some cases be performed using one or more of the baseband modulator/demodulators 415 or baseband demodulators 601 described with reference to previous Figures.

Thus, the method 1400 may compensate for receive I/Q imbalances in an OFDM signal. It should be noted that the method 1400 is just one implementation and that the operations of the method 1400 may be rearranged or otherwise modified such that other implementations are possible.

In an alternate embodiment of the method 1400, the method 1400 may be modified such that, at block 1430, the frequency domain version of the quadrature component of the OFDM signal (rather than the frequency domain version of the in-phase component of the OFDM signal) may be scaled at the wireless modem 210, according to a frequency dependent I/Q imbalance compensation function, to obtain an imbalance compensated frequency domain version of the quadrature component of the OFDM signal. More particularly, the frequency dependent I/Q imbalance compensation function may scale the frequency domain version of the quadrature component of the OFDM signal by the frequency-dependent scalar $$\frac{1 + j\beta(f)}{1 + \alpha(f)}$$

to produce the imbalance compensated frequency domain version of the quadrature component, where $\alpha$ includes a gain imbalance coefficient for the OFDM signal, $\beta$ includes a phase imbalance coefficient for the OFDM signal, and f includes the frequency of the quadrature component of the OFDM signal (or simply the frequency of the OFDM signal). The gain and phase imbalance coefficients used in the modified block 1430 will typically differ from the gain and phase imbalance coefficients used in the block 1430. The operations at modified block 1430 may in some cases be performed using one or more of the scalar modules 315 described with reference to the previous Figures.

At a modified block 1435, the imbalance compensated frequency domain version of the quadrature component of the OFDM signal may be summed with the frequency domain version of the in-phase component of the OFDM signal to produce an imbalance compensated frequency domain version of the OFDM signal. The operations at the modified block 1435 may in some cases be performed using one or more of the adder circuits 320 described with reference to previous Figures.

Other operations of the alternate embodiment of method 1400 may be performed similarly to the operations performed at blocks 1405, 1410, 1415, 1420, 1425, 1440, and 1445 of method 1400.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with at least one processor, such as a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

A computer program product or computer-readable media includes both computer-readable storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein, but is to be accorded the widest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology may be used in much of the description below, although the techniques are applicable beyond LTE applications.

What is claimed is:

1. A method of compensating for I/Q impairments in a digital signal, comprising:
   decomposing, at a wireless modem, the digital signal into a plurality of components;
   scaling, at the wireless modem, a frequency domain version of a first component from the plurality of components according to a frequency dependent I/Q impairment precompensation function to obtain a precompensated frequency domain version of the first component;
   combining, at the wireless modem, the precompensated frequency domain version of the first component with a frequency domain version of a second component from the plurality of components to produce a precompensated frequency domain version of the digital signal;
   transforming, at the wireless modem, the precompensated frequency domain version of the digital signal to a time domain to produce a precompensated time domain version of the digital signal; and
   transmitting, from the wireless modem, the precompensated time domain version of the digital signal over a wireless channel.

2. The method of claim 1, wherein the digital signal comprises an in-phase component and a quadrature component in a time domain, and wherein each of the frequency domain version of the first component and the frequency domain version of the second component corresponds to one of the in-phase component or the quadrature component.

3. The method of claim 1, further comprising:
   equalizing, at the wireless modem, the precompensated frequency domain version of the digital signal in a frequency domain prior to transforming the precompensated frequency domain version of the digital signal to the time domain, wherein the equalizing comprises equalizing in the frequency domain at least one or more of an in-band amplitude ripple associated with an analog low-pass filter or an in-band phase ripple associated with the analog low-pass filter.

4. The method of claim 1, further comprising:
   performing, at the wireless modem, a discrete Fourier transform separately on a time domain version of the first component and a time domain version of the second component of the digital signal to obtain the frequency domain version of the first component and the frequency domain version of the second component, respectively.

5. The method of claim 4, wherein the digital signal comprises a single carrier signal, the method further comprising:
   performing, at the wireless modem, an inverse discrete Fourier transform on the precompensated frequency domain version of the digital signal; and
   performing, at the wireless modem, baseband demodulation on an output of the inverse discrete Fourier transform or on the precompensated frequency domain version of the digital signal.

6. The method of claim 1, further comprising:
   selecting, at the wireless modem, a gain imbalance coefficient and a phase imbalance coefficient of the digital signal with respect to a frequency of the first component;
   wherein the frequency dependent I/Q impairment precompensation function is based on the gain imbalance coefficient and the phase imbalance coefficient.

7. The method of claim 6, further comprising:
receiving, at the wireless modem, at least one measurement of an I/Q impairment associated with a wireless channel; and
determining, at the wireless modem, one or both of the gain imbalance coefficient and the phase imbalance coefficient based on the received at least one measurement.

8. The method of claim 6, wherein scaling the frequency domain version of the first component comprises:
use a frequency-dependent scalar for the first component, wherein the frequency-dependent scalar is defined by $$(1 \pm j\beta(f))/(1+\alpha(f))$$

wherein $\alpha$ comprises the gain imbalance coefficient, $\beta$ comprises the phase imbalance coefficient, and f comprises the frequency.

9. The method of claim 6, further comprising:
receiving a plurality of versions of the digital signal from a plurality of antenna ports in accordance with a multiple input multiple output (MIMO) transmission of the digital signal, each antenna port associated with a separate gain imbalance coefficient and a separate phase imbalance coefficient; and
performing a joint imbalance compensation and spatial equalization operation on the frequency domain version of the first component by multiplying the frequency domain version of the first component by a MIMO spatial equalizer matrix adapted according to the gain imbalance coefficients and the phase imbalance coefficients of the plurality of antenna ports.

10. The method of claim 1, wherein the method further comprises:
computing, at the wireless modem, the frequency domain version of the first component of the digital signal as:

$$X\_e(f)=\tfrac{1}{2}[X(f)+X^*(-f)]; \text{ and}$$

computing, at the wireless modem, the second component of the digital signal as:

$$X\_o(f)=\tfrac{1}{2}[X(f)-X^*(-f)];$$

wherein X_e(f) comprises the first component of the digital signal, X_o(f) comprises the second component of the digital signal, X(f) comprises a frequency domain version of the digital signal, and f comprises a frequency.

11. An apparatus for compensating for I/Q impairments in a digital signal, comprising:
means for decomposing the digital signal into a plurality of components;
means for scaling a frequency domain version of a first component from the plurality of components according to a frequency dependent I/Q impairment precompensation function to obtain a precompensated frequency domain version of the first component;
means for combining the precompensated frequency domain version of the first component with a frequency domain version of a second component from the plurality of components to produce a precompensated compensated frequency domain version of the digital signal;
means for transforming the precompensated frequency domain version of the digital signal to a time domain at a wireless modem to produce a precompensated time domain version of the digital signal; and
means for transmitting the precompensated time domain version of the digital signal from the wireless modem over a wireless channel.

12. The apparatus of claim 11, further comprising:
equalizing the precompensated frequency domain version of the digital signal in a frequency domain prior to transforming the precompensated frequency domain version of the digital signal to the time domain, wherein the equalizing comprises equalizing in the frequency domain at least one or more of an in-band amplitude ripple associated with an analog low-pass filter or an in-band phase ripple associated with the analog low-pass filter.

13. The apparatus of claim 11, further comprising:
means for performing a discrete Fourier transform separately on a time domain version of the first component and a time domain version of the second component of the digital signal to obtain the frequency domain version of the first component and the frequency domain version of the second component, respectively.

14. The apparatus of claim 13, wherein the digital signal comprises a single carrier signal, the apparatus further comprising:
means for performing an inverse discrete Fourier transform on the precompensated frequency domain version of the digital signal; and
means for performing baseband demodulation on an output of the inverse discrete Fourier transform or on the precompensated frequency domain version of the digital signal.

15. The apparatus of claim 11, further comprising:
means for selecting a gain imbalance coefficient and a phase imbalance coefficient of the digital signal with respect to a frequency of the first component;
wherein the frequency dependent I/Q impairment precompensation function is based on the gain imbalance coefficient and the phase imbalance coefficient.

16. The apparatus of claim 15, further comprising:
means for receiving at least one measurement of an I/Q impairment associated with a wireless channel; and
means for determining one or both of the gain imbalance coefficient and the phase imbalance coefficient based on the received at least one measurement.

17. The apparatus of claim 15, wherein the means for scaling the frequency domain version of the first component comprises:
means for using a frequency-dependent scalar for the first component, wherein the frequency-dependent scalar is defined by $$(1 \pm j\beta(f))/(1+\alpha(f))$$

wherein $\alpha$ comprises the gain imbalance coefficient, $\beta$ comprises the phase imbalance coefficient, and f comprises the frequency.

18. The apparatus of claim 15, further comprising:
means for receiving a plurality of versions of the digital signal from a plurality of antenna ports in accordance with a multiple input multiple output (MIMO) transmission of the digital signal, each antenna port associated with a separate gain imbalance coefficient and a separate phase imbalance coefficient; and
means for performing a joint imbalance compensation and spatial equalization operation on the frequency domain version of the first component by multiplying the frequency domain version of the first component by a MIMO spatial equalizer matrix adapted according to the gain imbalance coefficients and phase imbalance coefficents of the plurality of antenna ports.

19. The apparatus of claim 11, further comprising:
means for computing the first component of the digital signal as:

$$X\_e(f)=\tfrac{1}{2}[X(f)+X^*(-f)];$$ and means for computing the second component of the digital signal as:

$$X\_o(f)=\tfrac{1}{2}[X(f)-X^*(-f)];$$

wherein $X\_e(f)$ comprises the first component of the digital signal, $X\_o(f)$ comprises the second component of the digital signal, $X(f)$ comprises a frequency domain version of the digital signal, and f comprises a frequency.

20. A wireless modem configured to compensate for transmit I/Q impairments in a digital signal comprising a plurality of components, the wireless modem comprising:
a processor;
a scaling circuit configured to scale a frequency domain version of a first component from the plurality of components according to a frequency dependent I/Q impairment precompensation function to obtain a precompensated frequency domain version of the first component;
an adder circuit configured to combine the precompensated frequency domain version of the first component with a frequency domain version of a second component from the plurality of components to produce a precompensated frequency domain version of the digital signal;
a transform circuit configured to transform the precompensated frequency domain version of the digital signal to a time domain to produce a precompensated time domain version of the digital signal; and
a transmitter configured to transmit the precompensated time domain version of the digital signal over a wireless channel.

21. The wireless modem of claim 20, further comprising:
an equalizer circuit communicatively coupled with the adder circuit and configured to equalize the precompensated frequency domain version of the digital signal in a frequency domain prior to transforming the precompensated frequency domain version of the digital signal to a time domain, wherein the equalizing comprises equalizing in the frequency domain at least one or more of an in-band amplitude ripple associated with an analog low-pass filter or an in-band phase ripple associated with the analog low-pass filter.

22. The wireless modem of claim 20, further comprising:
a first discrete Fourier transform circuit configured to transform a time domain version of the first component of the digital signal to the frequency domain version of the first component; and
a second discrete Fourier transform circuit configured to transform a time domain version of the second component of the digital signal to the frequency domain version of the second component.

23. The wireless modem of claim 20, wherein the digital signal comprises a single carrier signal, the wireless modem further comprising:

an inverse discrete Fourier transform circuit configured to transform the compensated frequency domain version of the digital signal to a time domain; and
a baseband modulator/demodulator circuit communicatively coupled with an output of the inverse discrete Fourier transform circuit.

24. The wireless modem of claim 20, further comprising:
a selection circuit configured to select a gain imbalance coefficient and a phase imbalance coefficient of the digital signal with respect to a frequency of the first component;
wherein the frequency dependent I/Q impairment precompensation function is based on the gain imbalance coefficient and the phase imbalance coefficient.

25. The wireless modem of claim 24, wherein the scaling circuit is further configured to:
use a frequency-dependent scalar for the first component, wherein the frequency-dependent scalar is defined by $$(1\pm j\beta(f))/(1+\alpha(f))$$

wherein $\alpha$ comprises the gain imbalance coefficient, $\beta$ comprises the phase imbalance coefficient, and f comprises the frequency.

26. The wireless modem of claim 20, further comprising:
a multiple input multiple output (MIMO) detector configured to receive a plurality of versions of the digital signal from a plurality of antenna ports in accordance with a MIMO transmission of the digital signal, each antenna port associated with a separate gain imbalance coefficient and a separate phase imbalance coefficient; and
a receiver processor configured to perform a joint imbalance compensation and spatial equalization operation on the frequency domain version of the first component by multiplying the frequency domain version of the first component by a MIMO spatial equalizer matrix adapted according to the gain imbalance coefficients and phase imbalance coefficients of the plurality of antenna ports.

27. A non-transitory computer-readable storage medium storing instructions executable by at least one processor to:
decompose a digital signal into a plurality of components;
scale a frequency domain version of a first component from the plurality of components according to a frequency dependent I/Q impairment precompensation function to obtain a precompensated frequency domain version of the first component;
combine the precompensated frequency domain version of the first component with a frequency domain version of a second component from the plurality of components to produce a precompensated frequency domain version of the digital signal;
transform the precompensated frequency domain version of the digital signal to a time domain to produce a precompensated time domain version of the digital signal; and
transmit the precompensated time domain version of the digital signal over a wireless channel.

* * * * *